US009536003B2

United States Patent
Zheng et al.

(10) Patent No.: US 9,536,003 B2
(45) Date of Patent: Jan. 3, 2017

(54) METHOD AND SYSTEM FOR HYBRID INFORMATION QUERY

(75) Inventors: Zhaohui Zheng, Beijing (CN); Rongqing Lu, Beijing (CN); Xin Li, Beijing (CN)

(73) Assignee: HAIZHI WANGJU NETWORK TECHNOLOGY (BEIJING) CO., LTD., Beijing (CN)

( * ) Notice: Subject to any disclaimer, the term of this patent is extended or adjusted under 35 U.S.C. 154(b) by 283 days.

(21) Appl. No.: 14/385,220

(22) PCT Filed: Mar. 17, 2012

(86) PCT No.: PCT/CN2012/072494
§ 371 (c)(1),
(2), (4) Date: Sep. 15, 2014

(87) PCT Pub. No.: WO2013/138968
PCT Pub. Date: Sep. 26, 2013

(65) Prior Publication Data
US 2015/0058320 A1   Feb. 26, 2015

(51) Int. Cl.
*G06F 17/30* (2006.01)
*G06F 7/00* (2006.01)
*G06F 21/62* (2013.01)

(52) U.S. Cl.
CPC ... *G06F 17/30867* (2013.01); *G06F 17/30312* (2013.01); *G06F 17/30864* (2013.01); *G06F 21/6245* (2013.01)

(58) Field of Classification Search
CPC ............ G06F 17/30864; G06F 17/3012; G06F 17/30867; G06Q 21/6245
USPC ........................................................ 707/722
See application file for complete search history.

(56) References Cited

U.S. PATENT DOCUMENTS

| | | | |
|---|---|---|---|
| 2006/0074883 A1* | 4/2006 | Teevan | G06F 17/30867 |
| 2008/0114751 A1* | 5/2008 | Cramer | G06F 17/30554 |
| 2008/0120289 A1* | 5/2008 | Golan | G06F 17/30696 |
| 2009/0132365 A1 | 5/2009 | Gruenhagen et al. | |
| 2010/0153215 A1 | 6/2010 | Abraham | |
| 2010/0268704 A1* | 10/2010 | Chou | G06F 17/30879 707/723 |

FOREIGN PATENT DOCUMENTS

CN    102339304 A    2/2012

OTHER PUBLICATIONS

International Search Report issued on Jan. 3, 2013 in International Application No. PCT/CN2012/072494.

* cited by examiner

*Primary Examiner* — Kuen Lu
(74) *Attorney, Agent, or Firm* — Pillsbury Winthrop Shaw Pittman LLP

(57) ABSTRACT

Method, system, and programs for hybrid information query. A request is first received from a user associated with a hybrid query. The hybrid query is expressed in accordance with an input in terms of one of a user, a feature, and a document, and a desired hybrid query result in terms of one of a user, a feature, and a document. A mapping is then determined between the input and the desired hybrid query result. A hybrid model is established based on hybrid information collected and associated with one or more users. The mapping is performed based on the hybrid model to obtain the desired hybrid query result based on the input. Eventually, the desired hybrid query result is provided as a response to the hybrid query.

18 Claims, 26 Drawing Sheets

METHOD AND SYSTEM FOR HYBRID INFORMATION QUERY

BACKGROUND

1. Technical Field

The present teaching relates to methods, systems, and programming for Internet services. Particularly, the present teaching relates to methods, systems, and programming for providing information to Internet users.

2. Discussion of Technical Background

Search engines are programs that search documents for specified keywords and return a list of the documents where the keywords were found. FIG. 1 illustrates a prior art search engine 100. The search engine 100 retrieves web pages by a web crawler. The contents of each page are then analyzed by a main module 102 to determine how it should be indexed. Data about web pages are stored in an index database 104 for use in later queries. When a user 106 enters a query 108 into the search engine 100 by using keywords, the main module 102 examines its index and provides the user 106 a listing of best-matching documents, e.g., web pages, from the index database 104 as query results 110 according to its criteria. However, the known search engine 100 only looks for the words or phrases in the documents exactly as entered from the query. It allows only query of documents through keywords. In other words, the query 108 is limited to only keywords, and the query result is limited to documents in the prior art search engine 100.

Personalized content recommendation may be available in the prior art search engine 100 by a content analyzer 112 and a content suggestion module 114. Traditional content recommendation may be realized in one of two ways—through collaborative filtering or content-based filtering. Collaborative filtering approaches build a model based on the user's public information, e.g., past behaviors, as well as similar decisions made by other users, and use that model to predict other content that the user may be interested in. Content-based filtering approaches utilize a series of discrete characteristics of known content stored in the database 104 in order to recommend additional content with similar properties. In addition, the prior art search engine 100 usually considers only explicit relationships among users and interests of users explicitly expressed based on their online content consumption activities. Implicit relationships, although handled in some existing technologies, are most identified via ad-hoc approaches. Furthermore, traditional recommendation systems usually only acquire data voluntarily provided by users, e.g., through questionnaires, or data recorded by the recommendation systems when users are directly interacting with the recommendation systems, e.g., cookies or activity logs when the users are signing in the recommendation systems. As a result, new users or inactive users of the recommendation systems cannot be used to provide data for building recommendation models. Accordingly, for new users or inactive users whose personal data is unavailable or sparse, the traditional systems become less effective in personalized content recommendation.

Therefore, there is a need to provide an improved solution for hybrid information query based on information associated with users, whether such information is static, dynamic, offline, online, explicit or implicit, all in a systematic and effective manner in order to solve the above-mentioned problems.

SUMMARY

The present teaching relates to methods, systems, and programming for hybrid information query.

In one example, a method implemented on at least one machine, each of which has at least one processor, storage, and a communication platform connected to a network for hybrid information query is disclosed. A request is first received from a user associated with a hybrid query. The hybrid query is expressed in accordance with an input in terms of one of a user, a feature, and a document, and a desired hybrid query result in terms of one of a user, a feature, and a document. A mapping is then determined between the input and the desired hybrid query result. A hybrid model is established based on hybrid information collected and associated with one or more users. The mapping is performed based on the hybrid model to obtain the desired hybrid query result based on the input. Eventually, the desired hybrid query result is provided as a response to the hybrid query.

In another example, a method implemented on at least one machine, each of which has at least one processor, storage, and a communication platform connected to a network for hybrid information query is disclosed. A request from a user associated with a hybrid query and authorization information to access dynamic private information of the user is first received. The hybrid query is expressed in accordance with an input in terms of one of a user, a feature, and a document, and a desired hybrid query result in terms of one of a user, a feature, and a document. The dynamic private information associated with the user is then received based on the authorization information. A hybrid model established based on hybrid information collected and associated with one or more users is retrieved. The dynamic private information of the user in the hybrid model is incorporated to obtain an updated hybrid model. The desired hybrid query result is identified based on the input and the updated hybrid model. Eventually, the desired hybrid query result is provided as a response to the hybrid query.

In still another example, a method implemented on at least one machine, each of which has at least one processor, storage, and a communication platform connected to a network for hybrid information query is disclosed. Hybrid information related to one or more users is continuously collected. The hybrid information is continuously analyzed to identify one or more explicit relationships in the hybrid information and to derive one or more implicit relationships among the one or more users based on the hybrid information. The hybrid information is then continuously indexed based on the explicit and implicit relationships such that each of the one or more users is associated with at least one of a topic of interest, another user, and content through hybrid indices. A hybrid model is continuously updated based on the hybrid indices. The hybrid model is used to derive a hybrid query result based on a hybrid query. The hybrid query is expressed in accordance with an input in terms of one of a user, a feature, and a document, and the hybrid query result in terms of one of a user, a feature, and a document.

In a different example, a system for hybrid information query is disclosed. The system includes a hybrid query interface and a hybrid response recommendation engine. The hybrid query interface configured to receive a request from a user associated with a hybrid query and provide the desired hybrid query result as a response to the hybrid query. The hybrid query is expressed in accordance with an input in terms of one of a user, a feature, and a document, and a desired hybrid query result in terms of one of a user, a feature, and a document. The hybrid response recommendation engine is configured to determine a mapping between the input and the desired hybrid query result. The hybrid response recommendation engine is further configured to retrieve a hybrid model established based on hybrid information collected and associated with one or more users and perform the mapping based on the hybrid model to obtain the desired hybrid query result based on the input.

In another different example, a system for hybrid information query is disclosed. The system includes a hybrid query interface, a hybrid information fetcher, a hybrid modeling unit, and a hybrid response recommendation engine. The hybrid query interface is configured to receive a request from a user associated with a hybrid query and authorization information to access dynamic private information of the user and provide the desired hybrid query result as a response to the hybrid query. The hybrid query is expressed in accordance with an input in terms of one of a user, a feature, and a document, and a desired hybrid query result in terms of one of a user, a feature, and a document. The hybrid information fetcher is configured to retrieve the dynamic private information associated with the user based on the authorization information. The hybrid modeling unit is configure to retrieve a hybrid model established based on hybrid information collected and associated with one or more users and incorporate the dynamic private information of the user in the hybrid model to obtain an updated hybrid model. The hybrid response recommendation engine is configured to identify the desired hybrid query result based on the input and the updated hybrid model.

In still another different example, a system for hybrid information query is disclosed. The system includes a hybrid information fetcher, a hybrid information profiling unit, an explicit/implicit relationship/interest indexer, and a hybrid modeling unit. The hybrid information fetcher is configured to continuously collect hybrid information related to one or more users. The hybrid information profiling unit is configured to continuously analyze the hybrid information to identify one or more explicit relationships in the hybrid information and to derive one or more implicit relationships among the one or more users based on the hybrid information. The explicit/implicit relationship/interest indexer is configured to continuously index the hybrid information based on the explicit and implicit relationships such that each of the one or more users is associated with at least one of a topic of interest, another user, and content through hybrid indices. The hybrid modeling unit is configured to continuously update a hybrid model based on the hybrid indices. The hybrid model is used to derive a hybrid query result based on a hybrid query. The hybrid query is expressed in accordance with an input in terms of one of a user, a feature, and a document, and the hybrid query result in terms of one of a user, a feature, and a document.

Other concepts relate to software for hybrid information query. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine-readable tangible and non-transitory medium having information for hybrid information query recorded thereon, wherein the information, when read by the machine, causes the machine to perform a series of steps. A request is first received from a user associated with a hybrid query. The hybrid query is expressed in accordance with an input in terms of one of a user, a feature, and a document, and a desired hybrid query result in terms of one of a user, a feature, and a document. A mapping is then determined between the input and the desired hybrid query result. A hybrid model is established based on hybrid information collected and associated with one or more users. The mapping is performed based on the hybrid model to obtain the desired hybrid query result based on the input. Eventually, the desired hybrid query result is provided as a response to the hybrid query.

In another example, a machine-readable tangible and non-transitory medium having information for hybrid information query recorded thereon, wherein the information, when read by the machine, causes the machine to perform a series of steps. A request from a user associated with a hybrid query and authorization information to access dynamic private information of the user is first received. The hybrid query is expressed in accordance with an input in terms of one of a user, a feature, and a document, and a desired hybrid query result in terms of one of a user, a feature, and a document. The dynamic private information associated with the user is then received based on the authorization information. A hybrid model established based on hybrid information collected and associated with one or more users is retrieved. The dynamic private information of the user in the hybrid model is incorporated to obtain an updated hybrid model. The desired hybrid query result is identified based on the input and the updated hybrid model. Eventually, the desired hybrid query result is provided as a response to the hybrid query.

In still another example, a machine-readable tangible and non-transitory medium having information for hybrid information query recorded thereon, wherein the information, when read by the machine, causes the machine to perform a series of steps. Hybrid information related to one or more users is continuously collected. The hybrid information is continuously analyzed to identify one or more explicit relationships in the hybrid information and to derive one or more implicit relationships among the one or more users based on the hybrid information. The hybrid information is then continuously indexed based on the explicit and implicit relationships such that each of the one or more users is associated with at least one of a topic of interest, another user, and content through hybrid indices. A hybrid model is continuously updated based on the hybrid indices. The hybrid model is used to derive a hybrid query result based on a hybrid query. The hybrid query is expressed in accordance with an input in terms of one of a user, a feature, and a document, and the hybrid query result in terms of one of a user, a feature, and a document.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 19 depicts a general computer architecture on which the present teaching can be implemented.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of hybrid information query. The method and system as disclosed herein is capable of recommending any one of a user, a feature, and a document as a response to a query given in any one of the forms of a user, a feature, and a document. The query and result in the present disclosure are associated not only based on explicit user interests or relationships but also based on implicit relationships that are inferred and/or derived based on users' history of online behavior via, e.g., derivation or propagation. Furthermore, the information query in the present disclosure is "hybrid" also in the sense that both online and offline user and content information, such as static and dynamic user profile and user-related content, are continuously collected to update a model for response recommendation in a recurrent manner. Moreover, the method and system are also self-adaptive based on users' activeness on the system. The method and system have the ability to provide fairly good recommendation as soon as a new user signs up to the system even with a few basic user attributes and then gradually and continuously improve the profile of the user as the user's participation increases.

Figure 1:
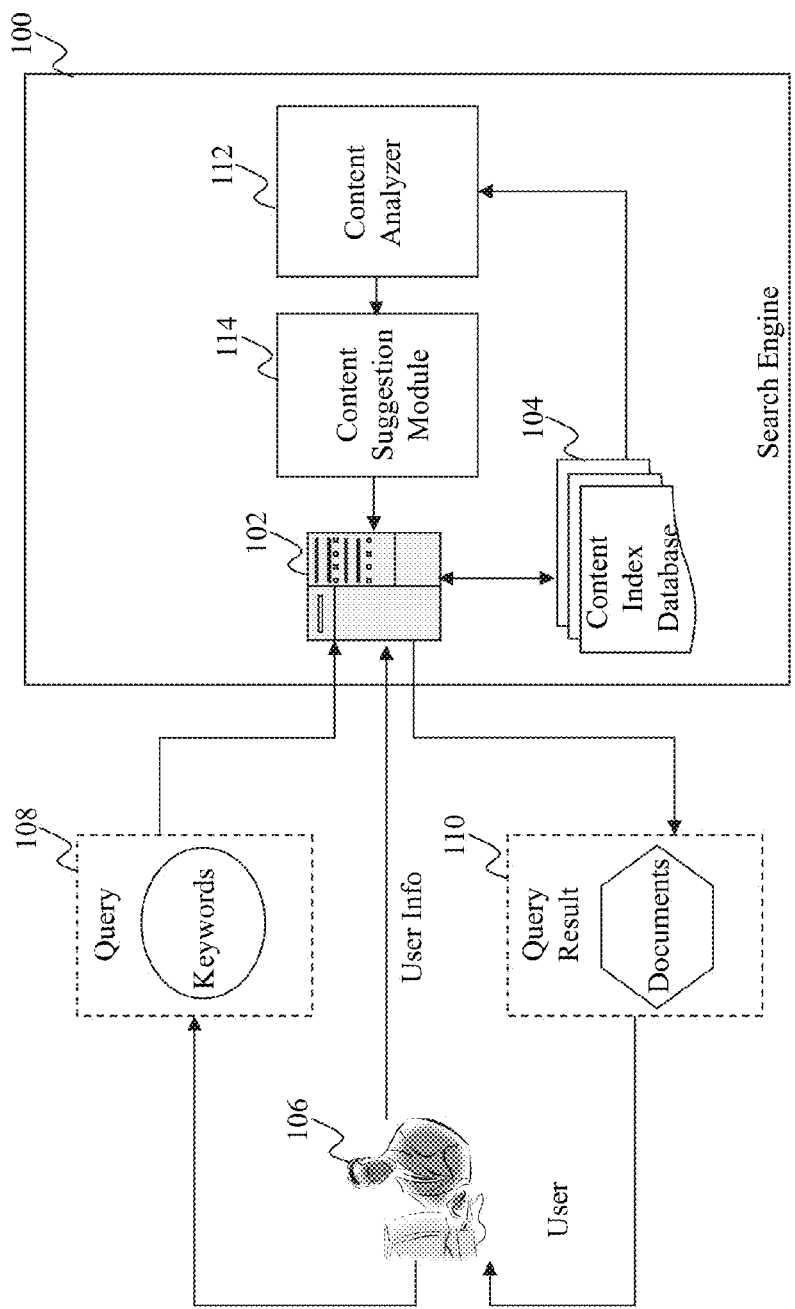
FIG. 1 depicts a prior art search engine based on keywords query and documents query result.
Figure 2:
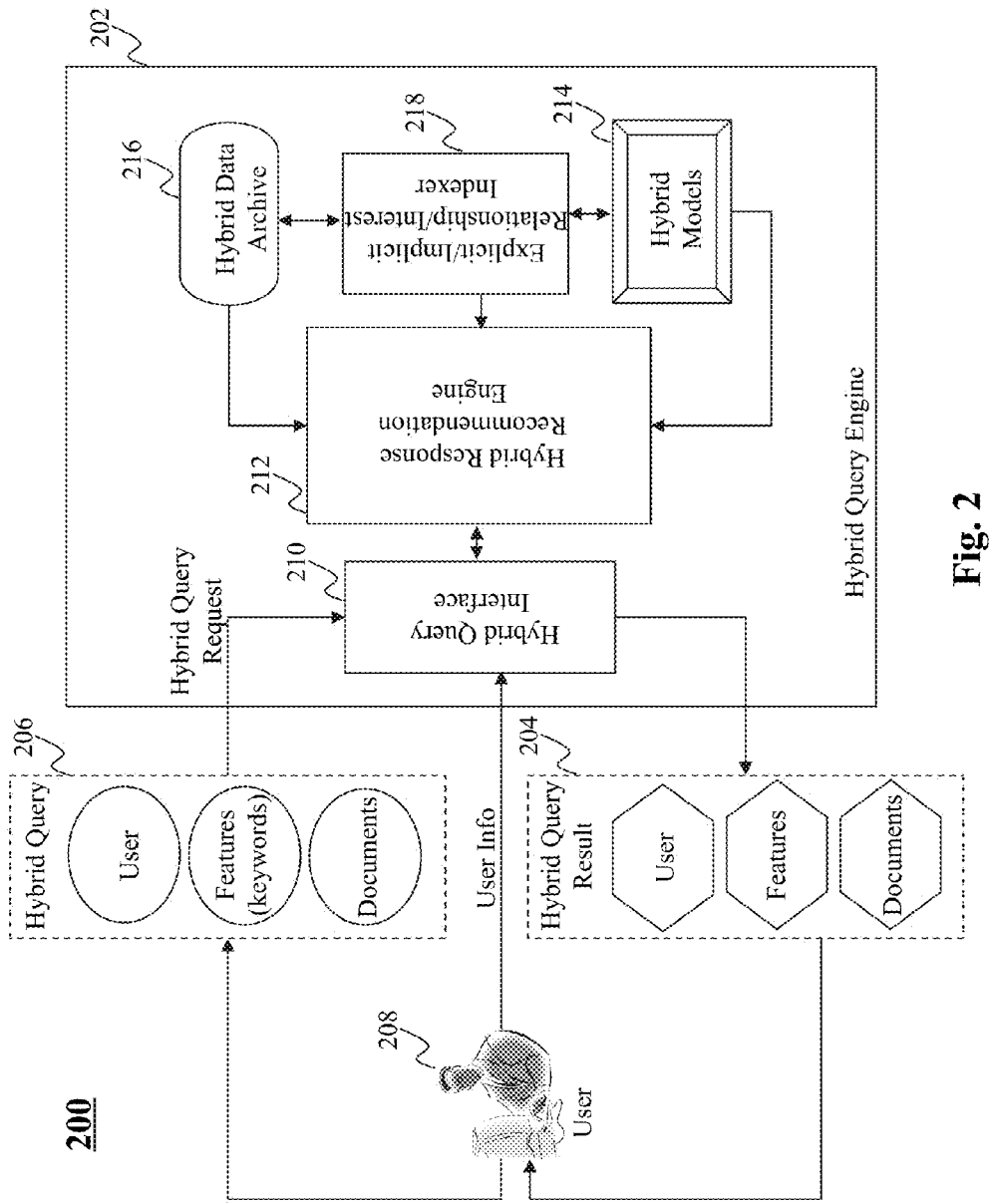
FIG. 2 is high level exemplary system diagrams of a system for hybrid information query, according to an embodiment of the present teaching.

FIG. 2 is a high level illustration of a system for hybrid information query, according to an embodiment of the present teaching. The system 200 includes a hybrid query engine 202 responsible for providing a hybrid query result 204 in response to a hybrid query 206 sent from a user 208. The system 200 is highly flexible as what can be queried and based on what information. For example, the mapping relationships between the query and query result may be any one of user to user, user to document, user to feature, document to user, document to document, document to feature, feature to user, feature to document, and feature to feature. In one example, using users as a query, the hybrid query engine 202 is able to recommend (1) another user, such as the user's friends, followers, interest group mates, etc. as explicitly presented in the social networks, as well as "similar" users although not explicitly connected, but algorithmically identified based on users' explicit relationships; (2) profile features of the user; and (3) documents the user explicitly created, liked, forwarded, commented, etc., and is likely interested according to a recommendation model. In another example, using documents as a query, the hybrid query engine 202 is able to recommend (1) similar or related documents, where the similarity or relatedness is algorithmically calculated; (2) features of the documents, e.g., keywords or topics; and (3) users who explicitly create, like, forward, comment, etc., or is likely interested according to the recommendation model. In still another example, using features, such as keywords, entities, topics, latent variables, as a query, the hybrid query engine 202 is able to recommend (1) related features based on their correlation with the query; (2) documents having the features; and (3) users whose profiles matching the features.

In this example, the hybrid query 206 and hybrid query result 204 are communicated through a hybrid query interface 210 as inputs and outputs of the hybrid query engine 202, and the recommendation is made by a hybrid response recommendation engine 212 in accordance with hybrid recommendation models 214 and hybrid information stored in a hybrid data archive 216. The hybrid information in the hybrid data archive 216 may be continuously collected and updated by the hybrid query engine 202. In addition, in this example, personalized response recommendation may be made based not only on the explicit relationship/interests but also on implicit relationship/interests that can be inferred from hybrid information collected from both offline and online user information, such as user behaviors. Both the explicit and implicit relationship/interests are indexed by an explicit/implicit relationship/interest indexer 218. The indexed relationships/interests may be stored in the hybrid data archive 216 as part of the hybrid information and used for creating and continuously refining the hybrid models 214.

Figure 3A:
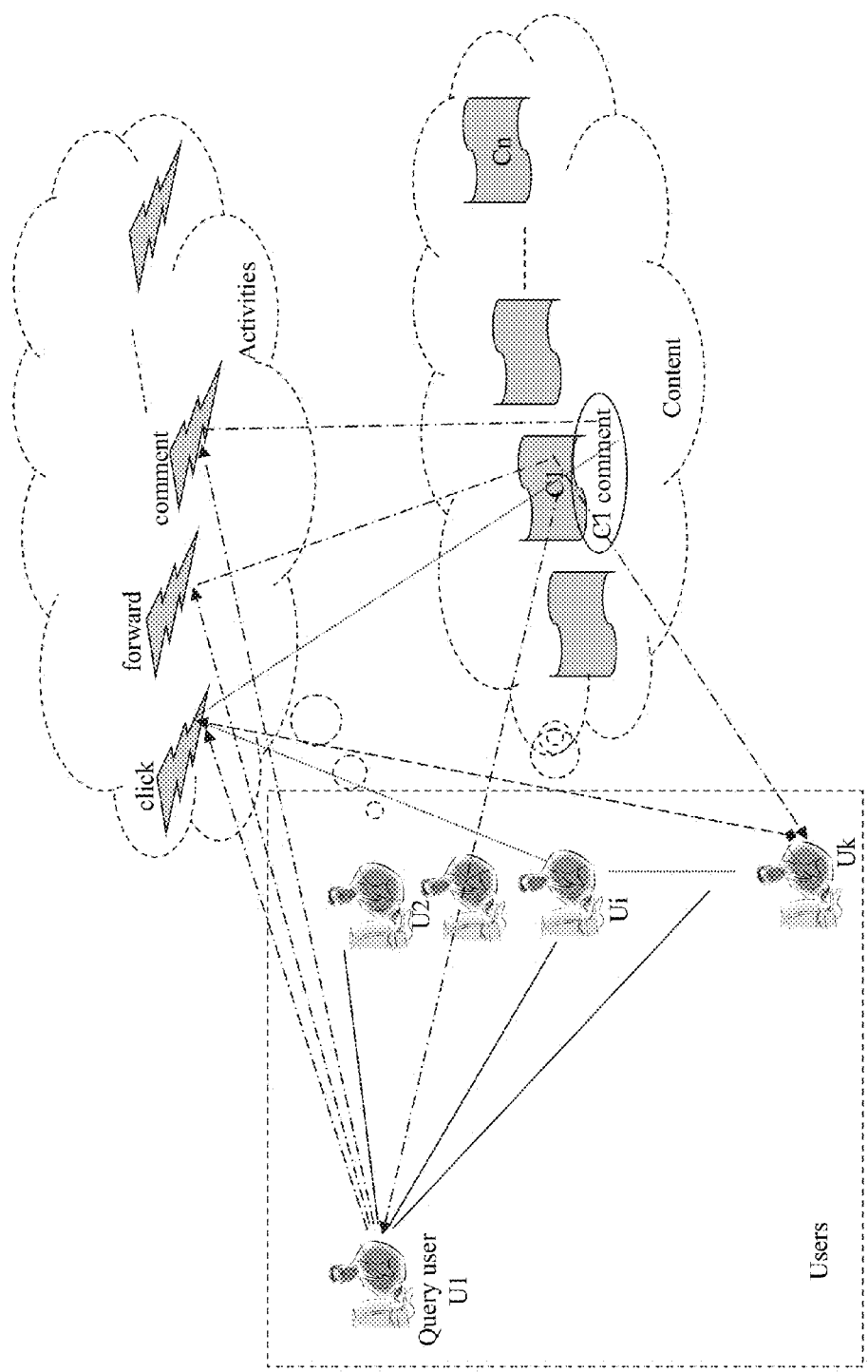
FIGS. 3(a) and 3(b) illustrate a hybrid data space in which a system for hybrid information query operates, according to an embodiment of the present teaching.
Figure 3B:
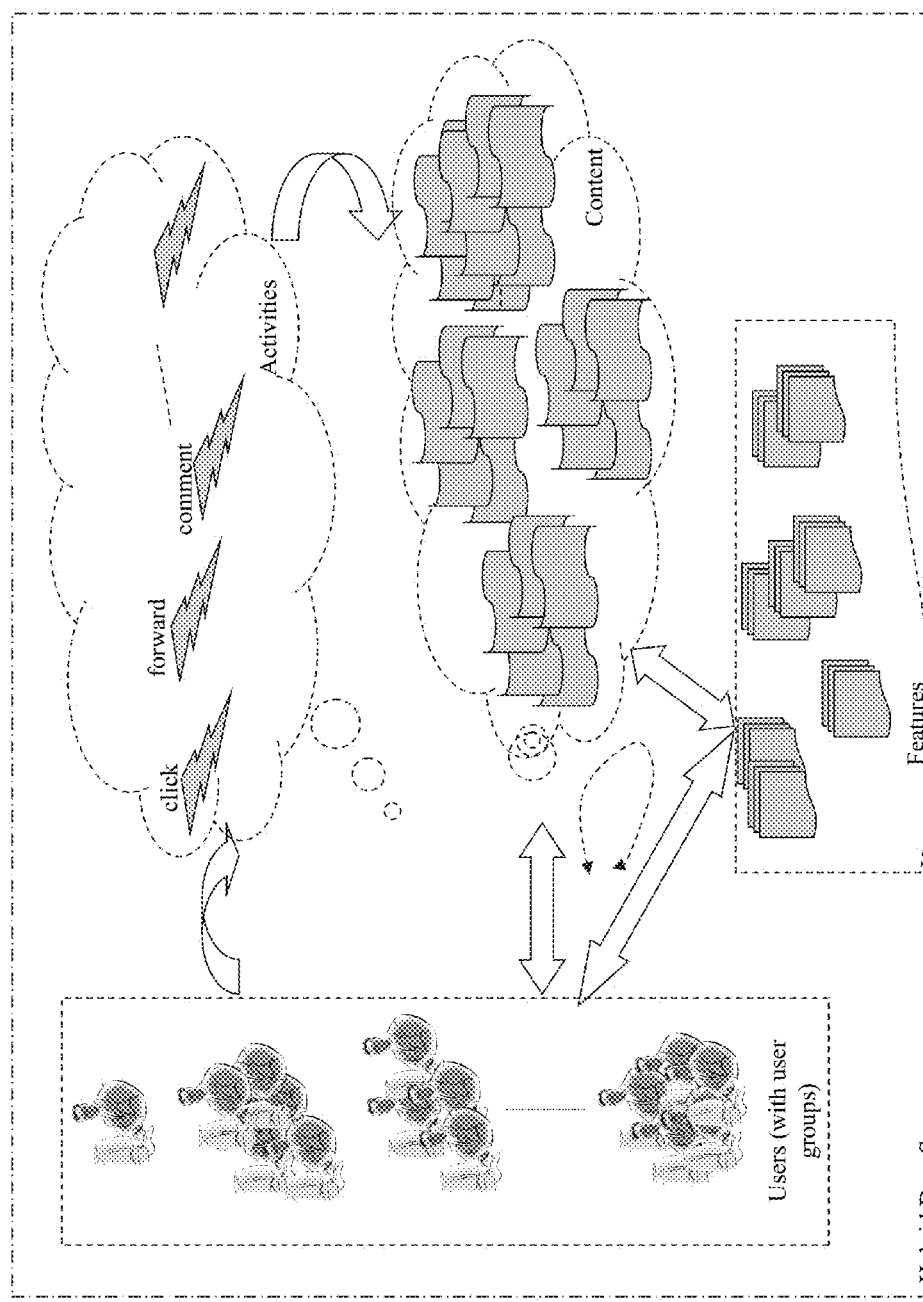

FIGS. 3(a) and 3(b) illustrate a hybrid data space in which a system for hybrid information query operates, according to an embodiment of the present teaching. Users, content, activities, and features (e.g., keywords) are all projected to the same space such that inference could be made based on implicit relationships among different data. FIG. 3(a) illustrates one example as to which information can be collected and utilized to infer hybrid relationships/interests of users or shared by users. For example, shared interests among different users may be inferred based on user online activities. In one example, if the query user U1 clicks content C1, then the system can infer that U1 has an implicit interest in the topic of C1. In another example, if U1 forwards C1 to another user Uk and Uk clicks C1, then the system can infer that U1 and Uk share the same interest in the topic of C1. In still another example, if U1 comments on C1 and another user Ui clicks U1's comment on C1, then the system can infer that U1 and Ui share the same implicit interest in the topic of C1. In yet another example, if Ui clicks another content Cn, and Uk also clicks the same content Cn, then the system can infer that Ui and Uk a shared the same interest in the topic of Cn. In yet another example, if U1 and U2 are in the same social group, or if U1 follows or is followed by U2 and U1 clicks C1, then the system can infer that U2 is also interested in the topic of content 1. The hybrid relationships/interests of users or shared by users may be used for establishing mappings between query and query result. In one example, user's explicit or implicit interest in a particular topic of content may be used to establish a link between the user and documents having the particular topic. In another example, the same interest in a particular topic of content shared by two users may be used to establish a link between the two users.

FIG. 3(b) illustrates the hybrid data space in which a system for hybrid information query operates. This hybrid space is different from the conventional schemes in that it utilizes a diverse range of activities to link users, documents, and features. From this space and the inter-relationships among different pieces of information, the system can group users into different interest groups, explore the relationship between users, and identify implicitly hidden user relationships, as well as their implicitly shared interests. In FIG. 3(b), in addition to users, activities, and content, features are also part of the hybrid data space in which hybrid information query is performed. The features may include, for example, keywords in a document, topics of a document, topics of an interest group, entities, or latent variables.

Figure 4:
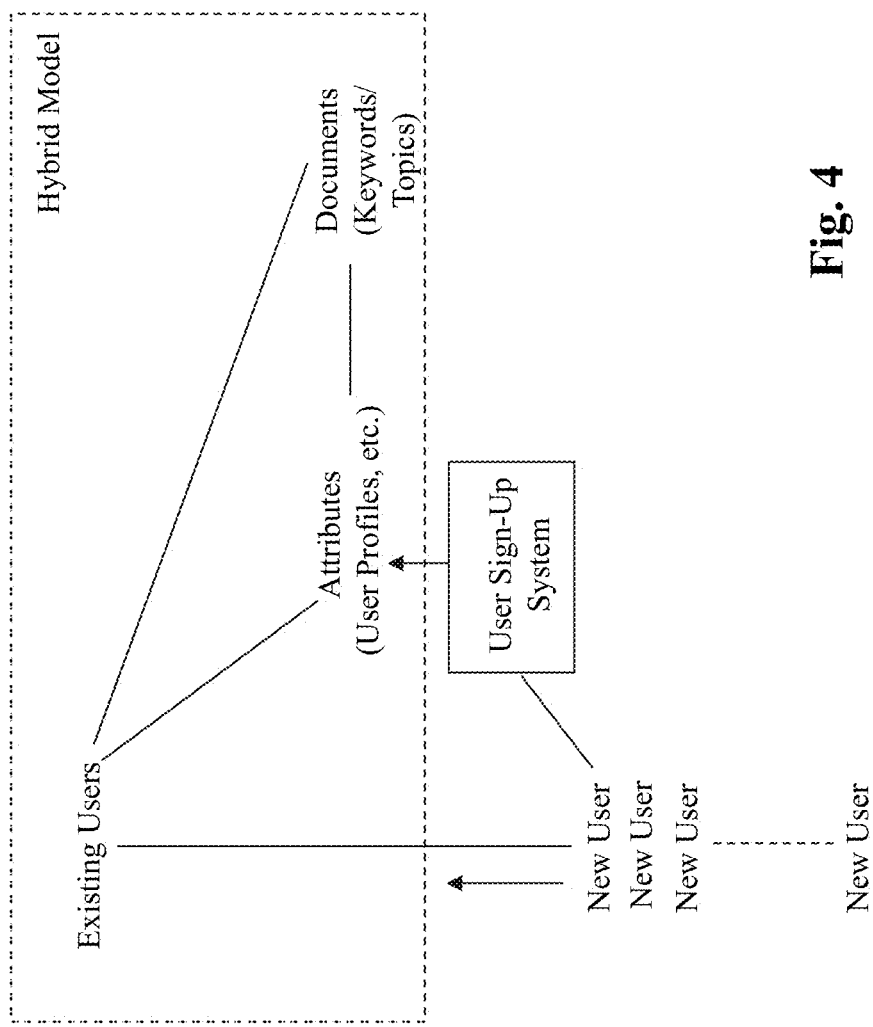
FIG. 4 is a high level depiction of a self-contained system for hybrid information query and its bootstrap capability, according to an embodiment of the present teaching.

FIG. 4 is a high level depiction of a self-contained system for hybrid information query and its bootstrap capability, according to an embodiment of the present teaching. In this example, when a new user signs up to the system, the new user provides profile information, which can be used to leverage the existence of an existing hybrid model built based on existing users to make recommended responses. The existing hybrid model is built based on hybrid information including user attributes and documents. After the initial round of recommendation, the new user's attributes can be incorporated into the existing model, and refinement can be made based on further collected hybrid information on all users. Each new user continuously migrates to become an existing user with their attributes being incorporated into the continuously refined hybrid model. That is, the system may evolve like that and achieve self-improvement in the self-contained eco system.

Figure 5:
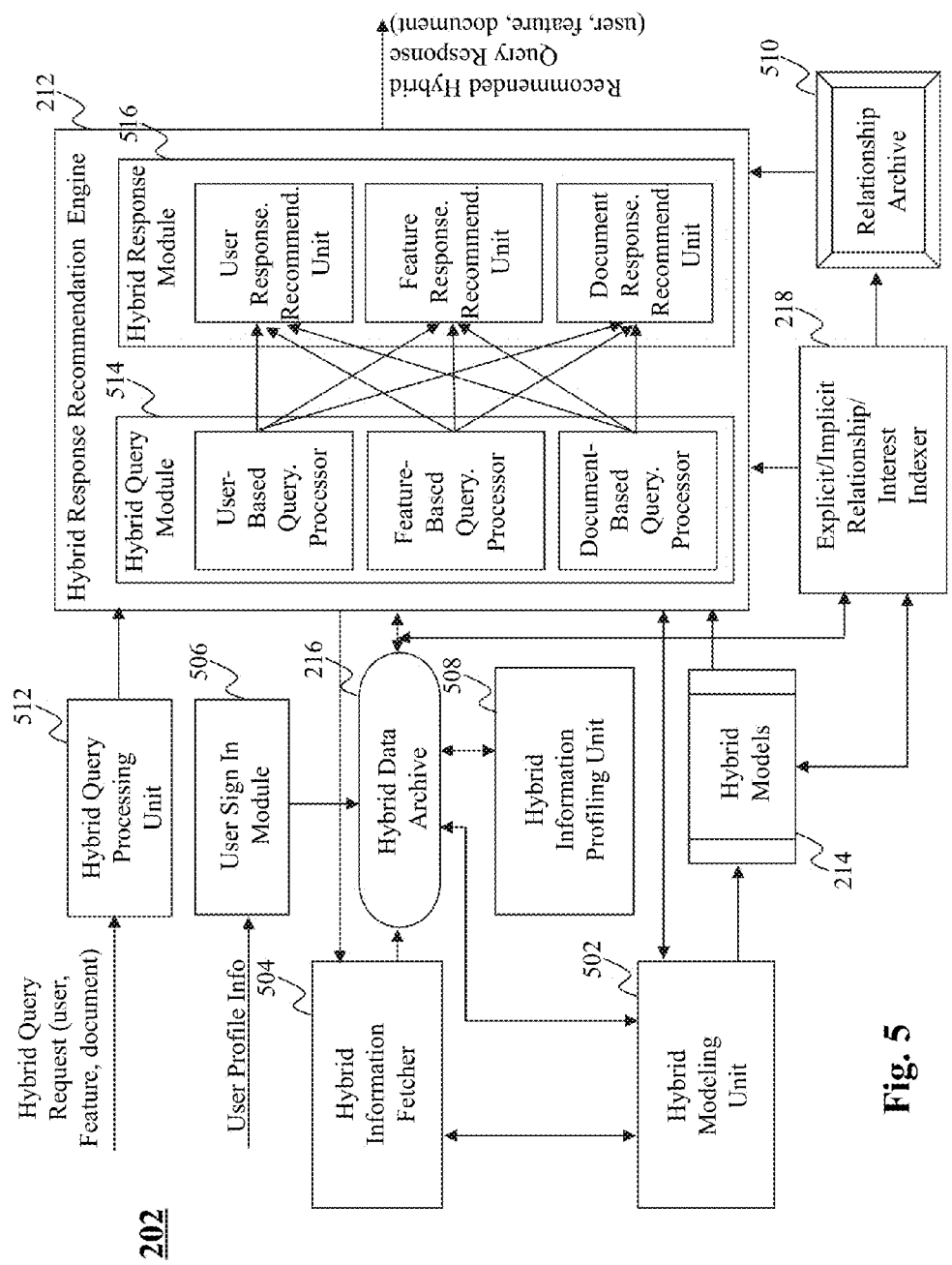
FIG. 5 is a system diagram for an exemplary hybrid query engine of the system for hybrid information query, according to an embodiment of the present teaching.

FIG. 5 is a system diagram for an exemplary hybrid query engine of the system for hybrid information query, according to an embodiment of the present teaching. The hybrid query engine 202 includes a hybrid response recommendation engine 212 configured to recommend any one of a user, a feature, and a document as a hybrid response to a hybrid query given in any one of the forms of user, feature, and document based on hybrid information from the hybrid data archive 216 and hybrid models 214 built and refined by a hybrid modeling unit 502.

As discussed before, the hybrid information includes any static, dynamic, online, or offline user information about the users and content information associated with usage of such content by the users. The hybrid information also includes activity information associated with online activities of the users and all the explicit and implicit relationships and interests of the users, which are indexed by the explicit/implicit relationship interest indexer 218, in the forms of indices. In addition, the hybrid information may further include derived user information and derived content information obtained based on the activity information. In some embodiments, features information, such as keywords or topics of interest extracted from documents may be included in the hybrid data archive 216 as part of the hybrid information.

In order to achieve up-to-date and comprehensive information profiling, the hybrid information may be obtained through both online and offline information fetching mechanisms, i.e., continuously collection of static information by a hybrid information fetcher 504 when users are offline, and real-time collection of dynamic information by the hybrid information fetcher 504 in conjunction with a user sign in module 506 when users are online. The hybrid information fetcher 504 is responsible for gathering extensive offline information, such as static user and content information that reflect a user's long-term interest or interest in generic contexts. The hybrid information fetcher 504 is also configured to, in conjunction with the user sign in module 506, capture online user information, such as dynamic user and content information during the time when the users sign in to the system, which reflect a user's short-term interest or interest in a specific real-time context. The online and offline hybrid information have complementary purposes as they reflect user's interests at complement resolutions (long-term vs. instant, generic vs. specific). As offline user information is more complete and more time-consuming to capture, the static user and content information are continuously gathered in a recurrent manner. As to dynamic user and content information, in one example, the user may sign in and provide authorization information to the user sign in module 506, such as a private token with a time limit for accessing the user's social network account, such that the hybrid information fetcher 504 is able to access and capture the user's private data from its private social network account at a run-time. The private data may include the user's most-recent news, events, blogs, social updates, etc. The fetched information is "hybrid" also in the sense that the representation of information can be very flexible: keywords based, user attributes, user categories, latent space, and so on. The various representations can be generally fitted into or derived from three categories of information as discussed above: user information about the users, content information associated with usage of such content by the users, and activity information associated with online activities of the users.

The "raw" data fetched by the hybrid information fetcher 504 may be fed into a hybrid information profiling unit 508 to derive or infer additional information in order to build online and offline profiles with respect to users or documents. The hybrid information profiling is done by performing various analyses on the hybrid information, such as but not limited to, extracting features from user attributes, deriving/inferring features from user attributes, deriving/inferring preferences/interests from user attributes, extracting keywords from documents, deriving/inferring topics of documents, predicting future user activity. The hybrid information profiling unit 508 is also responsible for indexing explicitly related or implicitly related hybrid information within the same category or across different information categories. As discussed above, in addition to explicit relationships and interests, implicit relationships and interests may be also identified, for example, through analyzing user's activity information along with other hybrid information by the hybrid information profiling unit 508. The online and offline profiling and indexing may be either user-centric or content-centric, i.e., building profiles around users or documents. The online and offline profiles and indices may be stored in the hybrid data archive 216 as part of the hybrid information. All the indices that link two or more pieces of hybrid information may be stored in the relationship archive 510 for quick retrieval of a query result once a query input arrives.

The hybrid modeling unit 502 in this example is configured to build and continuously refine different recommendation models that map any type of query input to the same or different type of query result. In each model, one type of hybrid information may be represented as a matrix, and two or more matrices may be applied to obtain a mapping from a hybrid query input to a hybrid query output. In one example, the model may be established based on a user attribute matrix representing user features with respect to all existing users and a topic/keyword matrix representing topics/keywords (i.e., content features) with respect to the existing users.

It is noted that the model as described herein can be used to facilitate or enable such hybrid queries because the information contained in the model allows comprehensive matching in order to identify the query result sought by a hybrid query. As discussed, user to user matching based on interested topics may be achieved by identifying rows in topic/keyword matrix that are similar. That is, users corresponding to such rows have shared interests. On the other hand, if one is query about other users who have similar attributes, user to user matching may be performed by analyzing user attribute matrix on the similarity between the row representing the querying user and rows representing other users. In another example, if a querying user provides a document as input and asks for a similar document, then a document to document matching need to be carried out. This can also be facilitated by the model as disclosed herein so long as there are indices made from the topics identified in topic/keyword matrix that point to the actual documents under such topics. In this case, the input document may be first parsed and analyzed and features, e.g., keywords or topics, are identified. Through such topics and by tracing by following the indices, similar documents can be identified. In the same fashion, if a document is provided via a query and the request is to identify other users who are interested in similar documents, rows in topic/keyword matrix that include similar topics or keywords can be identified and users corresponding to such rows can be identified as the query response.

In addition to attribute-topic matrices as discussed above, other matrix data for building the hybrid models 214 may include user-user matrices of various relationships, user-content matrices of various relationships, user-attribute matrices, content-keywords matrices, keyword-keyword co-occurrence/co-location matrices, etc. To build the hybrid models 214, joint matrix factorization may be applied to some or all of the matrices with proper weights and regularization to obtain latent representation of all users and contents, as well as transformation matrices mapping from user attributes to latent variables and from keywords to latent variables.

In this example, the hybrid information fetcher 504, hybrid information profiling unit 508, and hybrid modeling unit 502 continuously run offline in a recurrent manner to refresh the hybrid data archive 216, hybrid models 214, and relationship archive 510. Once a hybrid query request is received by a hybrid query processing unit 512, for example, when a new user signs up or a third-party service provider sends a request, the type of query input and desired query result is first identified. Depending on whether the query input and the desired query result is user, feature, or document, an appropriate processor in the hybrid query module 514 and an appropriate unit in the hybrid response module 516 are selected by the hybrid response recommendation engine 212 to make the recommendation by lookup table (indices) or similarity retrieval.

Figure 6:
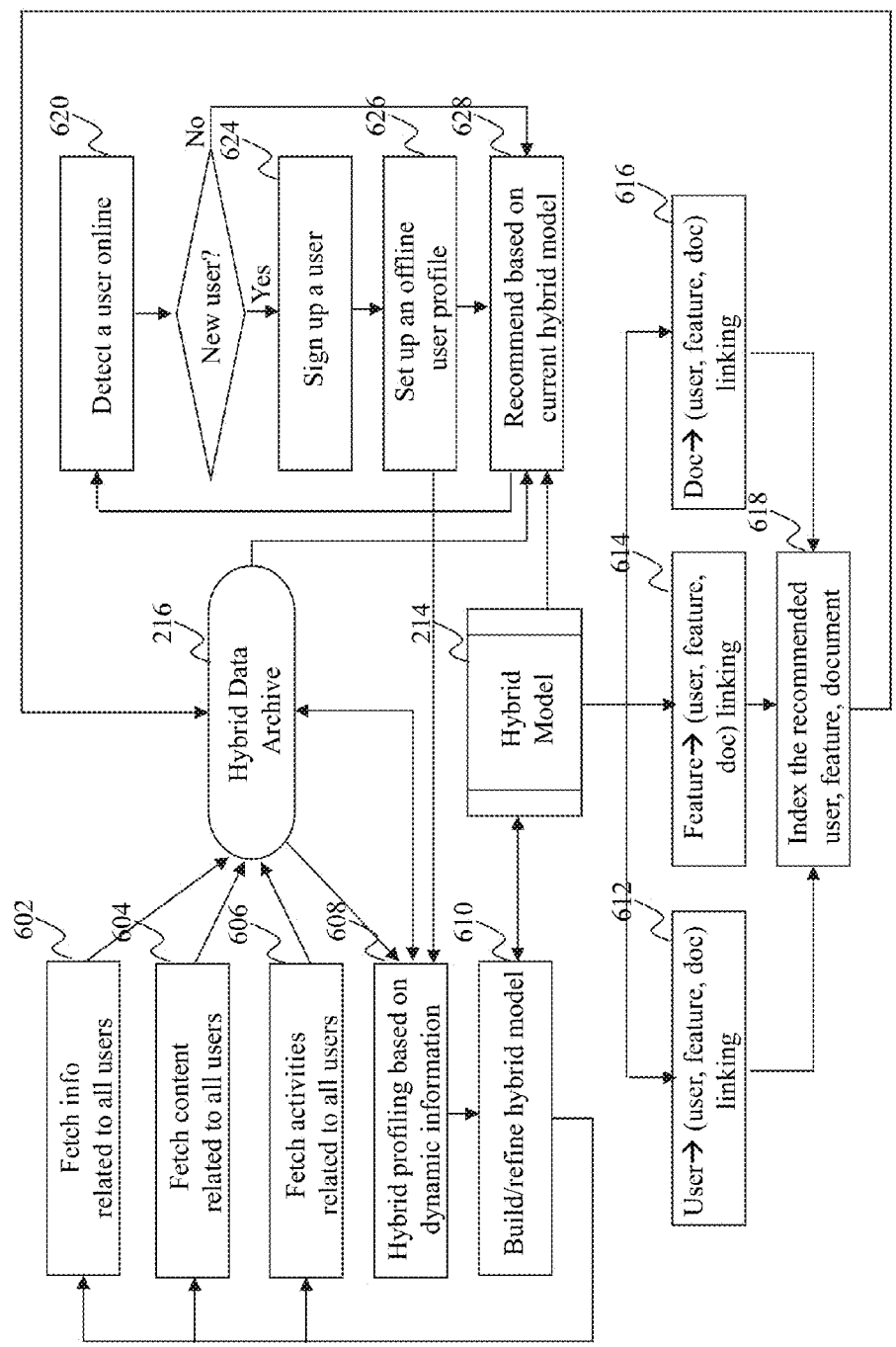
FIG. 6 is a flowchart of an exemplary process of the hybrid query engine, according to an embodiment of the present teaching.

FIG. 6 is a flowchart of an exemplary process of the hybrid query engine, according to an embodiment of the present teaching. Starting from blocks 602, 604, 606, user information, content information, and activity information related to all users are fetched respectively and fed into the hybrid data archive 216. At block 608, hybrid profiling is performed based on the continuously updated hybrid information retrieved from the hybrid data archive 216. Moving to block 610, hybrid models 214 are built and continuously refined based on refreshed hybrid information. At blocks 612, 614, 616, user based linking, feature based linking, and document based linking are also performed respectively based on the hybrid model 214 in a recurrent manner in order to index the recommended user, feature, and documents at block 618 for fast update and retrieval. It is noted that blocks 602-618 are all performed offline to reduce latency during recommendation. Now moving to block 620, once an existing user is detected to be online, a recommendation may be made directly based on the current hybrid model and hybrid information by following the corresponding indices. If the online user is a new user, the new user signs up at block 624 such that the system may set up an offline user profile for the new user at block 626 and perform hybrid profiling based on the new user's profile at block 628.

Figure 7:
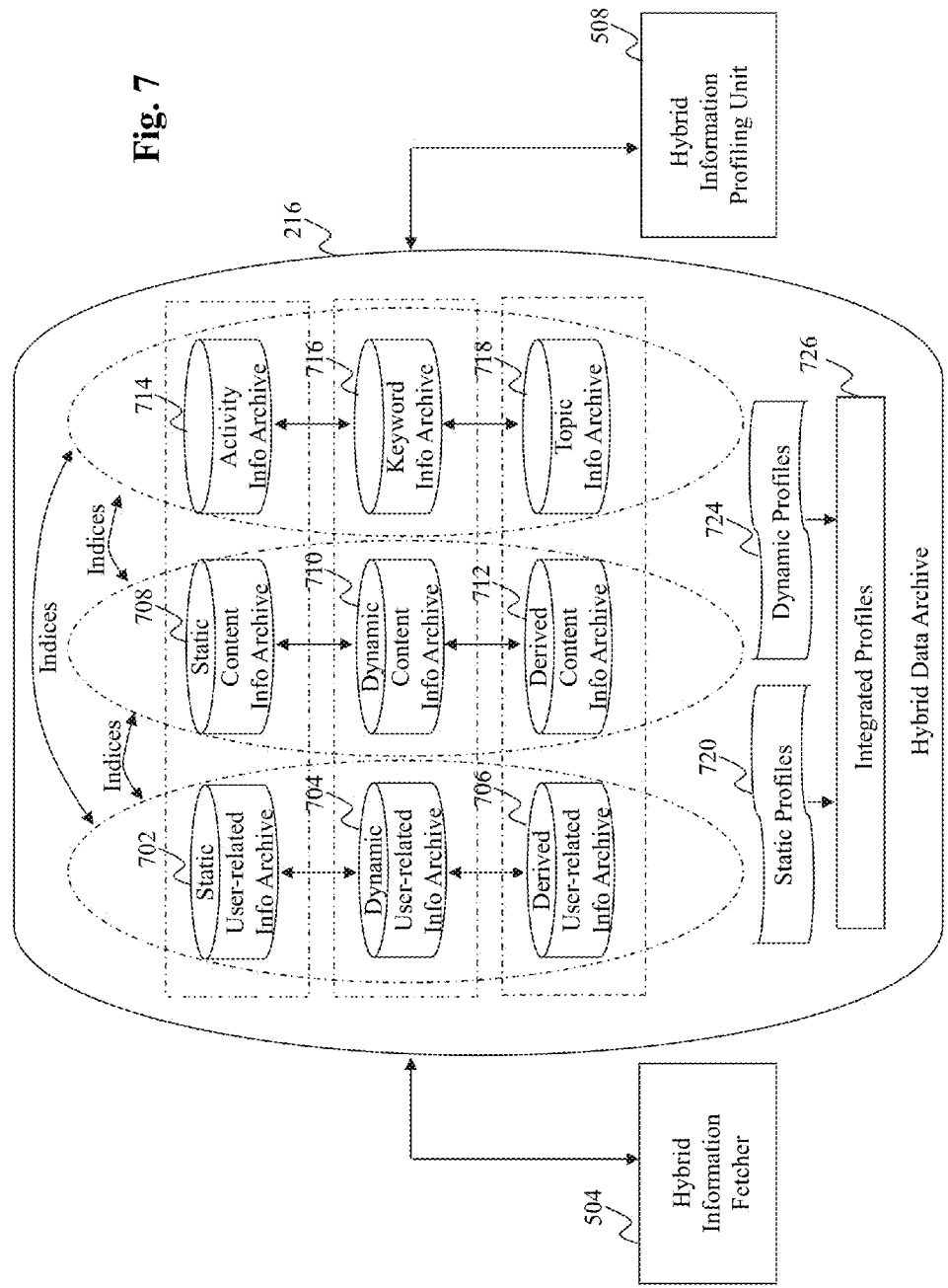
FIG. 7 is a system diagram for an exemplary hybrid data archive of the hybrid query engine, according to an embodiment of the present teaching.
Figure 8:
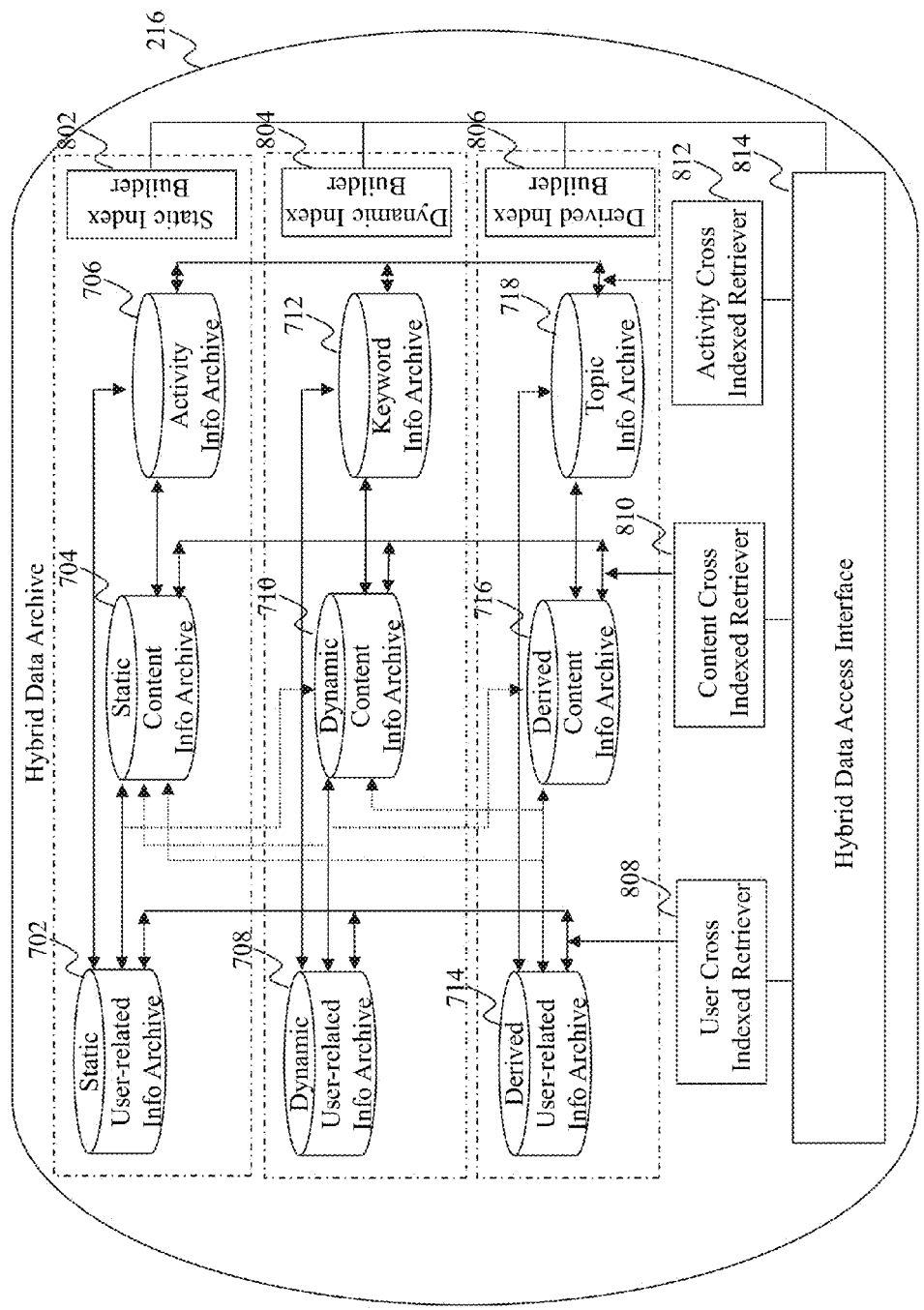
FIG. 8 is a system diagram for an exemplary hybrid data archive of the hybrid query engine, according to an embodiment of the present teaching.

FIGS. 7 and 8 are system diagrams for an exemplary hybrid data archive of the hybrid query engine, according to an embodiment of the present teaching. As discussed above, each type of hybrid information may be stored in one of the nine sub-archives of the hybrid data archive 216. Sub-archives 702, 704, 706 store user information. For example, static and dynamic user information may be collected by the hybrid information fetcher 504 and stored in the static user-related information archive 702 and dynamic user-related information archive 704, respectively. The derived user-related information archive 706 stores user information derived by the hybrid information profiling unit 508. In one example, link propagation methods may be applied to propagate user information (e.g., categories) of celebrities to every user in the social network based on the social graph and user activities (e.g., following, friends). The celebrity status of a social group member may be inferred by the number of followers in the social network. In general, the importance of a user in a social network can be inferred and the personal interests of an importance user who have a significant number of followers may be used to infer the interests of the followers.

Sub-archives 708, 710, 712 store content information. For example, static and dynamic content information may be collected by the hybrid information fetcher 504 and stored in the static content-related information archive 708 and dynamic content-related information archive 710. The derived content-related information archive 712 stores content information derived by the hybrid information profiling unit 508. In one example, content with the same or similar topics may be derived from static or dynamic content with a known topic. In another example, associated content, such as comments or edits on an article, may be derived from known static or dynamic content. In addition, activity information archive 714 stores activity information fetched by the hybrid information fetcher 504, and keyword information archive 716 and topic information archive 718 store keywords and topics of interest, respectively, which are features derived from user information and content information by the hybrid information profiling unit 508.

As discuss above, cross-indexing can be applied to create indices with respect to various hybrid information. For example, content-user indices link a document and a list of users who created, liked, shared, forward, commented the document, as well as the users likely interested in the documents determined by the hybrid models 214. In another example, content-feature indices (e.g., content-keyword, content-topic) link a document and its extracted keywords and derived/inferred topics. In still another example, each user may be linked to another user, a feature (keywords, topics), or content by user-based indices in the form of <key, value> pairs where the key is a user and the value is any one of user, feature, and document. The indices in the hybrid data archive 216 are continuously created with time stamps. Based on the hybrid information and their indices, static and dynamic profiles 720, 724 may be created based on either users or documents. For example, a static profile of a user reflects the user's generic attributes, such as gender, race, birthday, or long-term interests, while a dynamic profile reflects the user's short-term attributes, such as current location, or short-term interests. The static and dynamic profiles 720, 724 may be combined to create integrated profiles 726 that reflect both long-term and short-term features.

As shown in FIG. 8, the indices may be created with labels by the static index builder 802, dynamic index build 804, and derived index builder 806. The indexes may be built periodically in a recurrent manner. However, between any two runs, fold-in approaches may be applied to any new documents or users to build incremental or delta indexes for them respectively. Whenever a recommendation is needed, a lookup operation by following proper indices with labels may be performed by the user cross indexed retriever 808, content cross indexed retriever 810, or the activity cross indexed retriever 812 with minimum latency. The desired query result identified based on indices then can be retrieved from the proper sub-archive through a hybrid data access interface 814.

Figure 9:
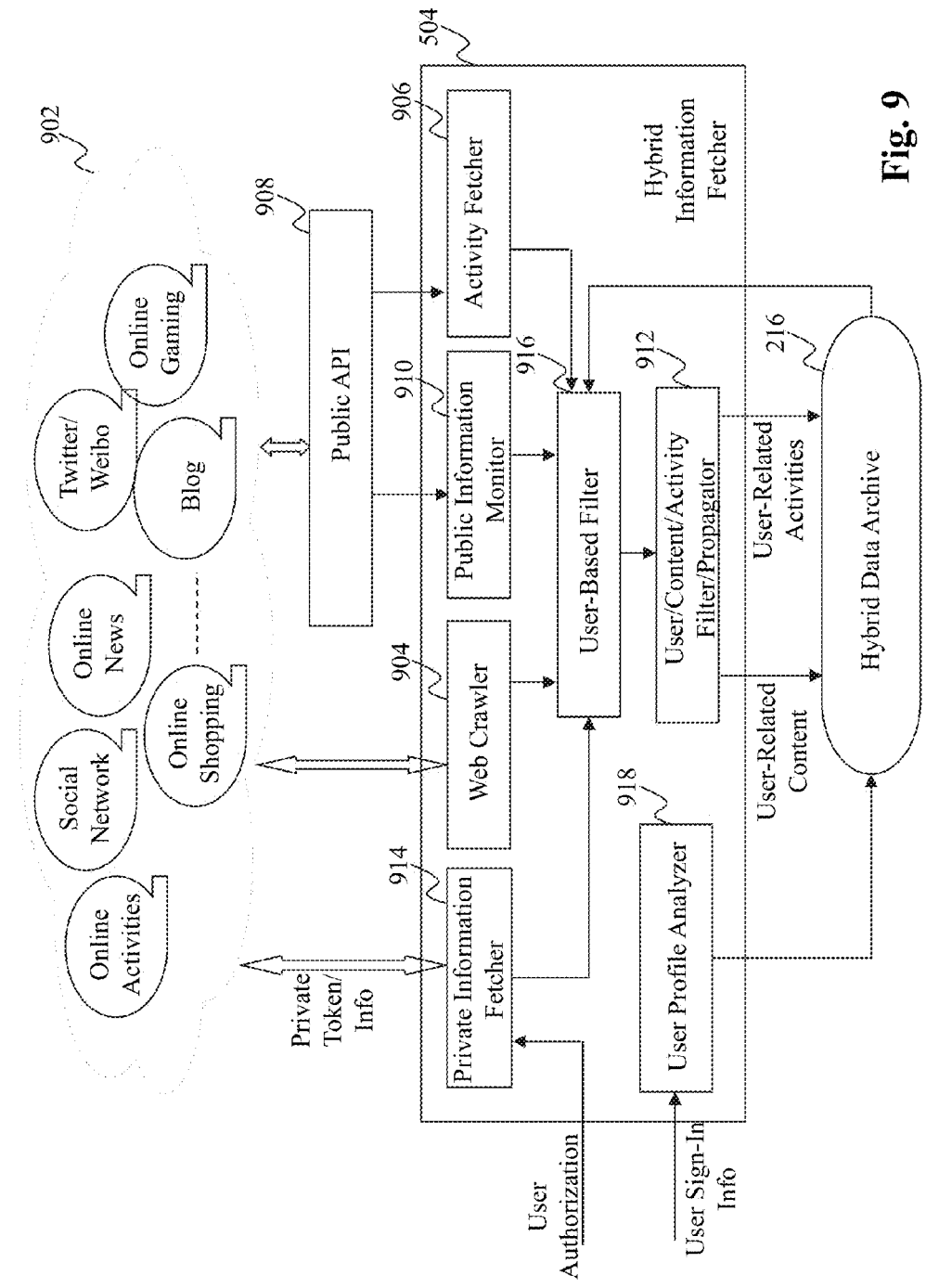
FIG. 9 is a system diagram for an exemplary hybrid information fetcher of the hybrid query engine, according to an embodiment of the present teaching.

FIG. 9 is a system diagram for an exemplary hybrid information fetcher of the hybrid query engine, according to an embodiment of the present teaching. Hybrid information may be dynamically monitored and retrieved by the hybrid information fetcher 504 from any content source 902 through the network. The content sources 902 in this example include, but are not limited to, social network sites (e.g., Facebook, Renren, QQ), online news sources, online gaming sites, online shopping sites, blogs, micro-blogs (e.g., Twitter, Sina Weibo).

Different types of hybrid information may be monitored and gathered through different mechanisms employed by the hybrid information fetcher 504. In this example, the user-related content and user profile may be collected by a web crawler 904, and the user activities may be monitored by an activity fetcher 906 through, e.g., a public API 908 which may be provided by each content source 902. The user-related activities may include any online activities that link users to content or reflect the user's interests, such as browsing through a website, clicking an advertisement, purchasing a product, following a business entity or an individual (e.g., a friend), commenting, forwarding, liking or sharing a blog or micro-blog entry, updating status of a social network account, etc. A public information monitor 910 may be also employed by the hybrid information fetcher 504 to gather any other suitable public information through the public API 908. In addition, the hybrid information fetcher 504 may include a user/content/activity filter/propagator 912, which may be responsible for inferring the user's interests through, e.g., the user's activities and social graph in a social network setting. For example, the user/content/activity filter/propagator 912 may be configured to apply link propagation methods to propagate labels (e.g., categories) of celebrities to every user in the social network based on the social graph and user activities (e.g., following, friends). The celebrity status of a social group member may be inferred by the number of followers in the social network. In general, the importance of a user in a social network can be inferred and the personal interests of an importance user who have a significant number of followers may be used to infer the interests of the followers. Also, as discussed above, a private information fetcher 914 may be employed to collect private data from content source 902, such as a user's social network account, upon user authorization. In this example, user's social graph is collected based on public information gathered by the public information monitor 910 and/or private data accessed by the private information fetcher 914.

In order to associate the monitored hybrid information to the correct user, a user-based filter 916 may be employed by the hybrid information fetcher 504 to, for each piece of information gathered, identify the correspondence between the information and the correct user. In this example, the user/content/activity filter/propagator 912 may be also responsible for reducing the volume of content and activities that will be saved to maximize the efficiency with minimal risks of losing important relevant information. Such reduction of volume in collected data may be performed according to certain criteria. In one example, outdated content or activities over a threshold time period may be filtered out. In another example, repetitive information may be removed by the user/content/activity filter/propagator 912. The hybrid information fetcher 504 may also include a user profile analyzer 918 configured to obtain user's sign-in information, such as attributes provided by a new user, or attributes updated by an existing user. As noted above, the hybrid information fetcher 504 may be continuously running to provide and update dynamic user information and content information and activity information to the hybrid data archive 216.

Figure 10:
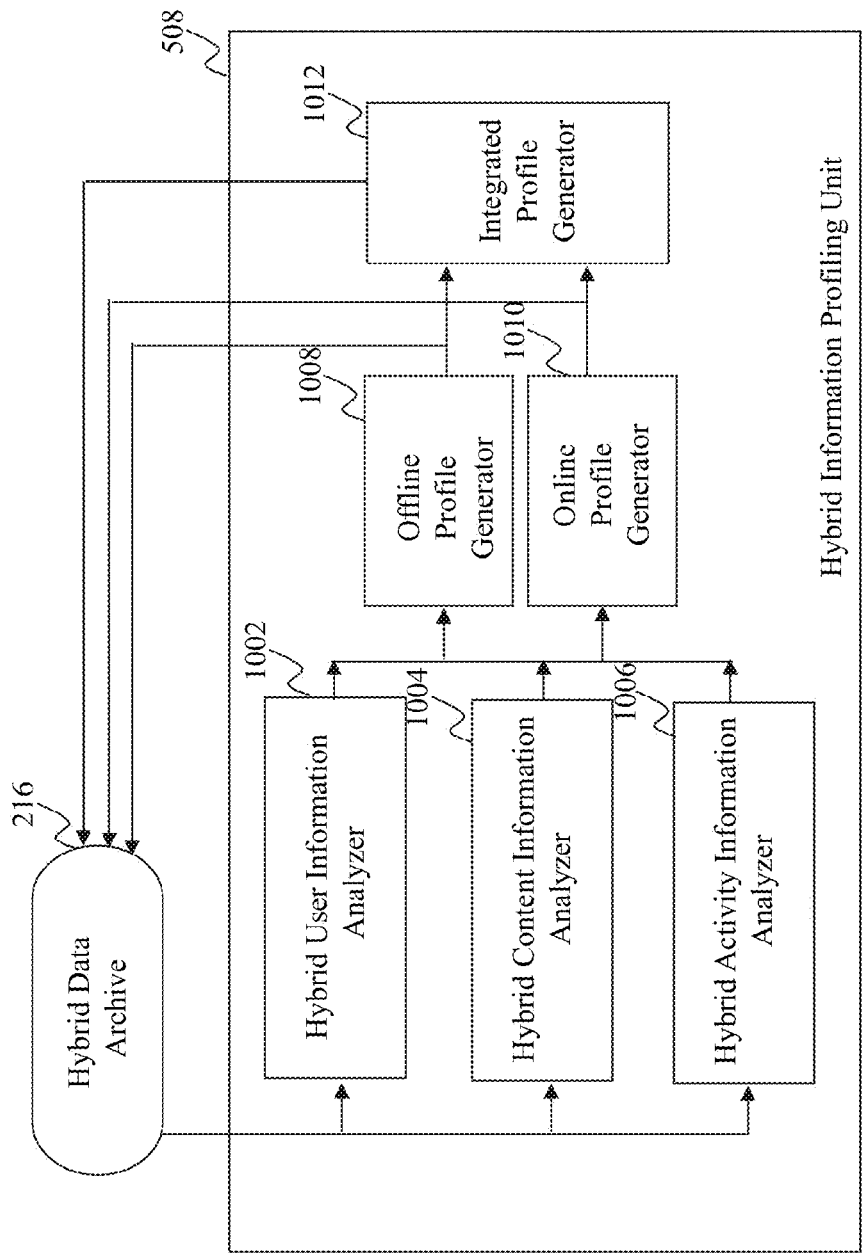
FIG. 10 is a system diagram for an exemplary hybrid information profiling unit of the hybrid query engine, according to an embodiment of the present teaching.

FIG. 10 is a system diagram for an exemplary hybrid information profiling unit of the hybrid query engine, according to an embodiment of the present teaching. The hybrid information profiling unit 508 includes a hybrid user information analyzer 1002, a hybrid content information analyzer 1004, and a hybrid activity information analyzer 1006. The hybrid user information analyzer 1002 is configured to analyze user information, such as user attributes, and populate it to the user related sub-archives in the hybrid data archive 216. The hybrid content information analyzer 1004 is configured to parse and analyze content information, through for example, feature extraction, and populate the extracted features to the keywords and topic information archives in the hybrid data archive 216. The hybrid activity information analyzer 1006 is configured to analyze the activities that link users to content, assign interests/relationship to users, and link them to content of interest and features (keywords/topics). The hybrid information profiling unit 508 may also include an offline profile generator 1008, an online profile generator 1010, and an integrated profile generator 1012 for creating offline, online, and integrated profiles, respectively, based on hybrid information profiling, as discussed above.

For user information profiling or content information profiling, in addition to keywords, topics, attributes, etc., there are also latent variables. Latent variables may be derived from joint matrix factorization, such as singular value decomposition, on user-user matrices of all kinds of relationship, user-content matrices of all kinds of relationship, content-keywords matrices, etc. For example, user attributes in a user attribute matrix and topics/keywords in a topic/keyword matrix may be co-clustered into parallel topics/clusters. Matrix factorization then may be applied to both matrices with a shared latent user profile matrix, where each row corresponds to a latent profile of a particular user, indicating the interests/kinships of the user to each topic/cluster. Fold-in inference then may be applied to obtain a user latent vector based on either user attribute or topic/keyword information.

Figure 11A:
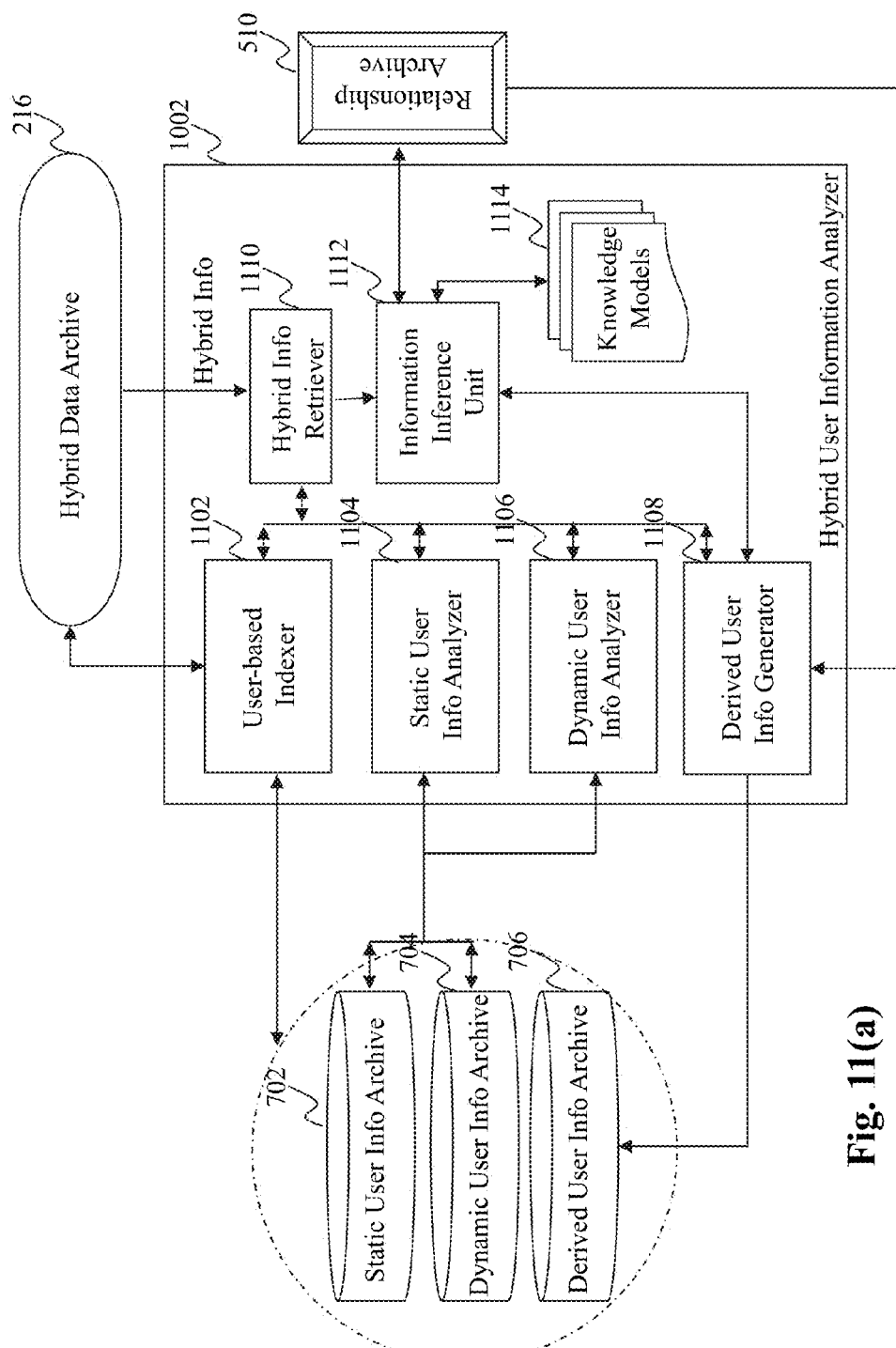
FIG. 11(a) is a system diagram for an exemplary hybrid user information analyzer of the hybrid information profiling unit, according to an embodiment of the present teaching.

FIG. 11(a) is a system diagram for an exemplary hybrid user information analyzer of the hybrid information profiling unit, according to an embodiment of the present teaching.

The hybrid user information analyzer 1002 includes a user-based indexer 1102, a static user information analyzer 1104, a dynamic user information analyzer 1106, and a derived user information generator 1108. The user-based indexer 1102 is responsible for performing user based index for all user information. The static user information analyzer 1104 and dynamic user information analyzer 1106 are responsible for analyzing offline and online user information, respectively. User features, such as user attributes or user preferences/topics of interest, may be obtained by the static and dynamic user information analyzer 1104, 1106 and indexed by the user-based indexer 1102 with respect to other hybrid information in the hybrid data archive 216. In addition, based on the analyzed static or dynamic user information, relevant information on content, activities, or features may be retrieved by a hybrid information retriever 1110 from the hybrid data archive 216. The retrieved relevant information is then used by an information inference unit 1112 in conjunction with the derived user information generator 1108 to infer, derive, or propagate the known information based on predefined knowledge models 1114 to obtain derived user information. Such derived user information is then stored back to the hybrid data archive 216 as related to the user and can be useful to extract and store implicit or explicit relationships or interests in the relationship archive 510. For example, the static user information analyzer 1104 by analyzing a user's offline user information may determine that the user has a long-term interest in basketball. The dynamic user information analyzer 1106 may further determine that the user just changed its current location to Chicago based on its most recent social network status update. The information inference unit 1112 then may infer that the user is likely interested in basketball teams in Chicago. Hybrid information related to basketball teams in Chicago may be retrieved by the hybrid information retriever 1110 and cross-indexed with respect to the user information. For example, articles regarding the Chicago Bulls Team may be indexed with the user to form content-user indices, and players of the Chicago Bulls may be indexed with respect to the user to form user-user indices. In one example, the information inference unit 1112 may further identify that the user graduated from Northwestern University in Chicago and thus, derive that the user is more likely interested in the college basketball team of Northwestern University instead of the Chicago Bulls. Such derived user information is also cross-indexed with other hybrid information and stored back to the hybrid data archive 216.

Figure 11B:
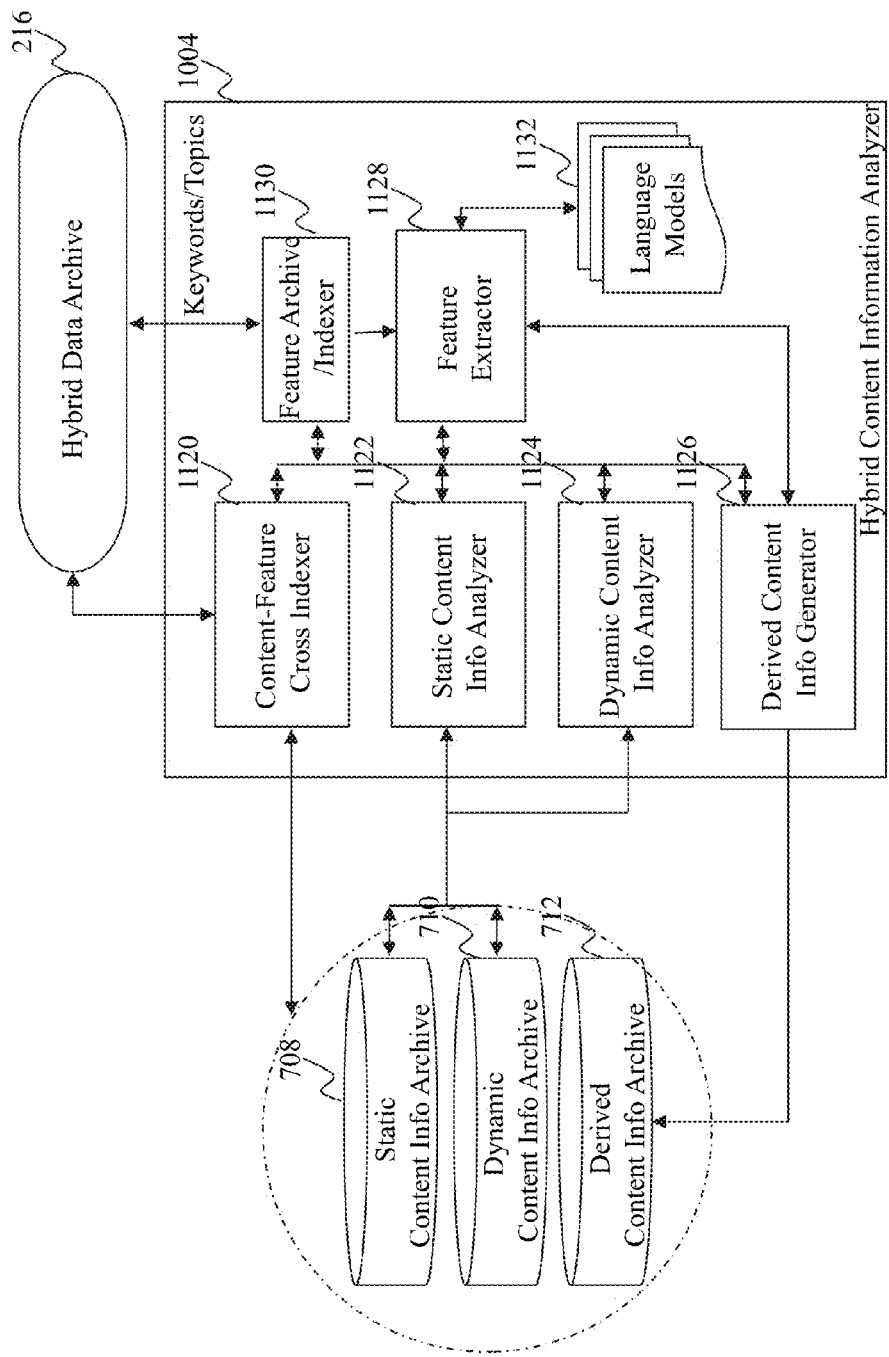
FIG. 11(b) is a system diagram for an exemplary hybrid content information analyzer of the hybrid information profiling unit, according to an embodiment of the present teaching.

FIG. 11(b) is a system diagram for an exemplary hybrid content information analyzer of the hybrid information profiling unit, according to an embodiment of the present teaching. The hybrid content information analyzer 1004 includes a content-feature cross indexer 1120, a static content information analyzer 1122, a dynamic content information analyzer 1124, and a derived content information generator 1126. The content-feature cross indexer 1120 is responsible for performing content-feature cross indexing. The static content information analyzer 1122 and dynamic content information analyzer 1124 are responsible for analyzing offline and online content information, respectively. Content features, such as keywords or topics, may be obtained by the static and dynamic content analyzer 1122, 1124 and indexed by the content-feature cross indexer 1120. In addition, based on the analyzed static or dynamic content information, relevant information on users (e.g., other users who also reviewed the content just analyzed), activities (e.g., past activities of the same user or other users who share the same interest as the user at issue) or features may be retrieved from the hybrid data archive 216 to infer, derive, or propagate the known information by a feature extractor 1128 in conjunction with a feature archive/indexer 1130 based on language models 1132 to obtain derived content information, such as related content, content by the same author on the same topic, content forwarded by others on the same topic, or content retrieved from a link forwarded from another user sharing the same interest as the user at issue. Such derived content information is then stored back to the hybrid data archive 216 as related to the user.

Figure 11C:
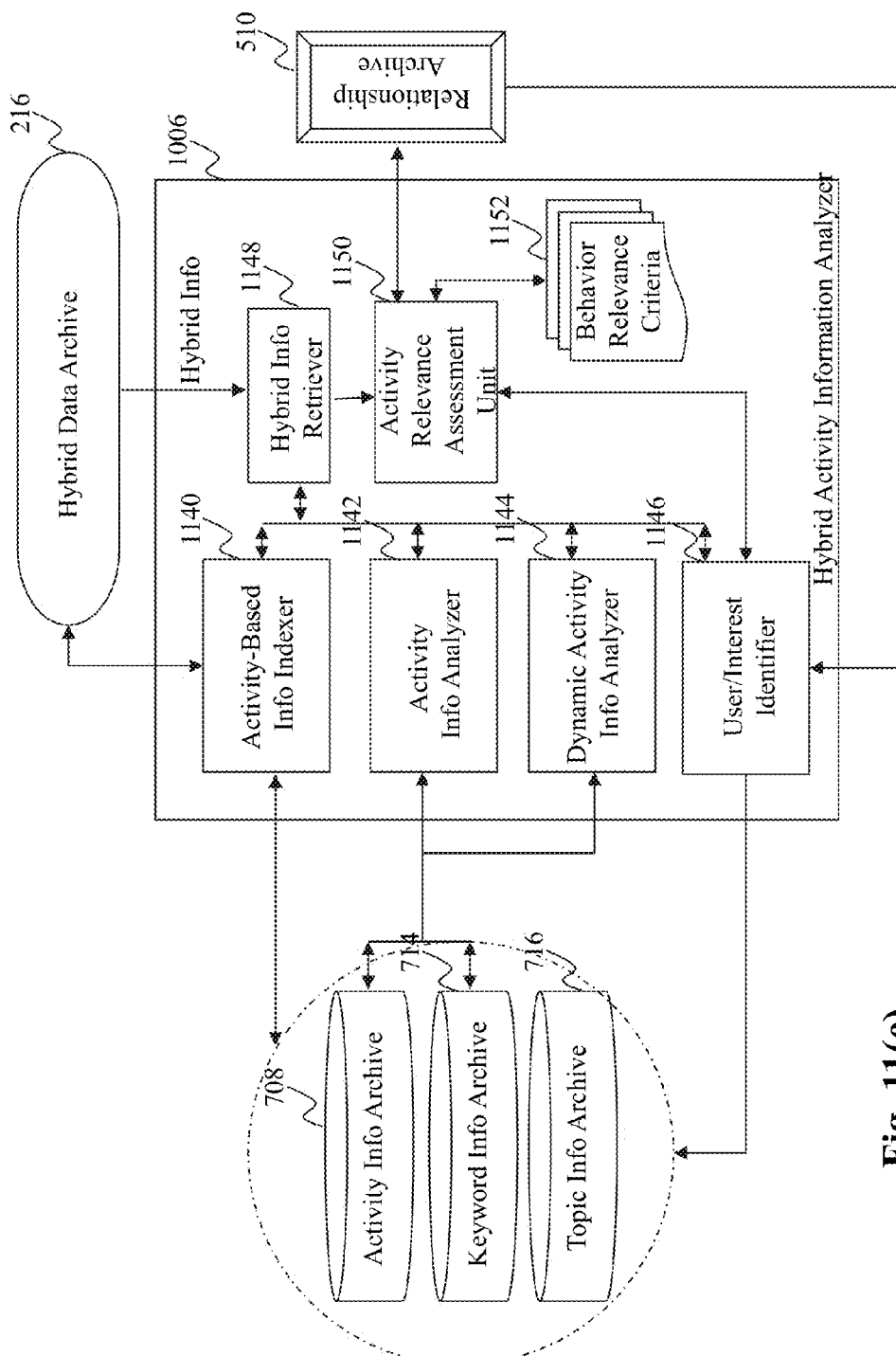
FIG. 11(c) is a system diagram for an exemplary hybrid activity information analyzer of the hybrid information profiling unit, according to an embodiment of the present teaching.

FIG. 11(*c*) is a system diagram for an exemplary hybrid activity information analyzer of the hybrid information profiling unit, according to an embodiment of the present teaching. The hybrid activity information analyzer 1006 includes an activity-based indexer 1140, an activity information analyzer 1142, a dynamic activity information analyzer 1144, and a user/interest identifier 1146. The activity-based indexer 1140 is responsible for performing activity-based indexing for all hybrid information. The activity information analyzer 1142 and dynamic activity information analyzer 1144 are responsible for analyzing past and dynamic activity information, respectively. Based on the analyzed past or dynamic activity information, relevant information on the same user (e.g., reaction of other users who also reviewed the content just analyzed and known to share the same interest as the user at issue on the topic) or past activities of the same user or other users who also have the same profile as the current user may be retrieved by a hybrid information retriever 1148 from the hybrid data archive 216 to infer, derive, or predict the possible action that the current user may have by an activity relevance assessment unit 1150 based on behavior relevance criteria 1152. This predicted action may be used to compare with the actual action (collected later), and the discrepancy may be used to refine the hybrid recommendation model. Such predicted activities are then stored back to the hybrid data archive 216 as related to the user and can be useful to extract and store implicit or explicit relationships or interests in the relationship archive 510. As discussed above with respect to FIGS. 3(*a*) and 3(*b*), activity information along with other hybrid information, such as user or content information, may be used to identify implicit user relationships or interests by the user/interest identifier 1146.

Figure 12:
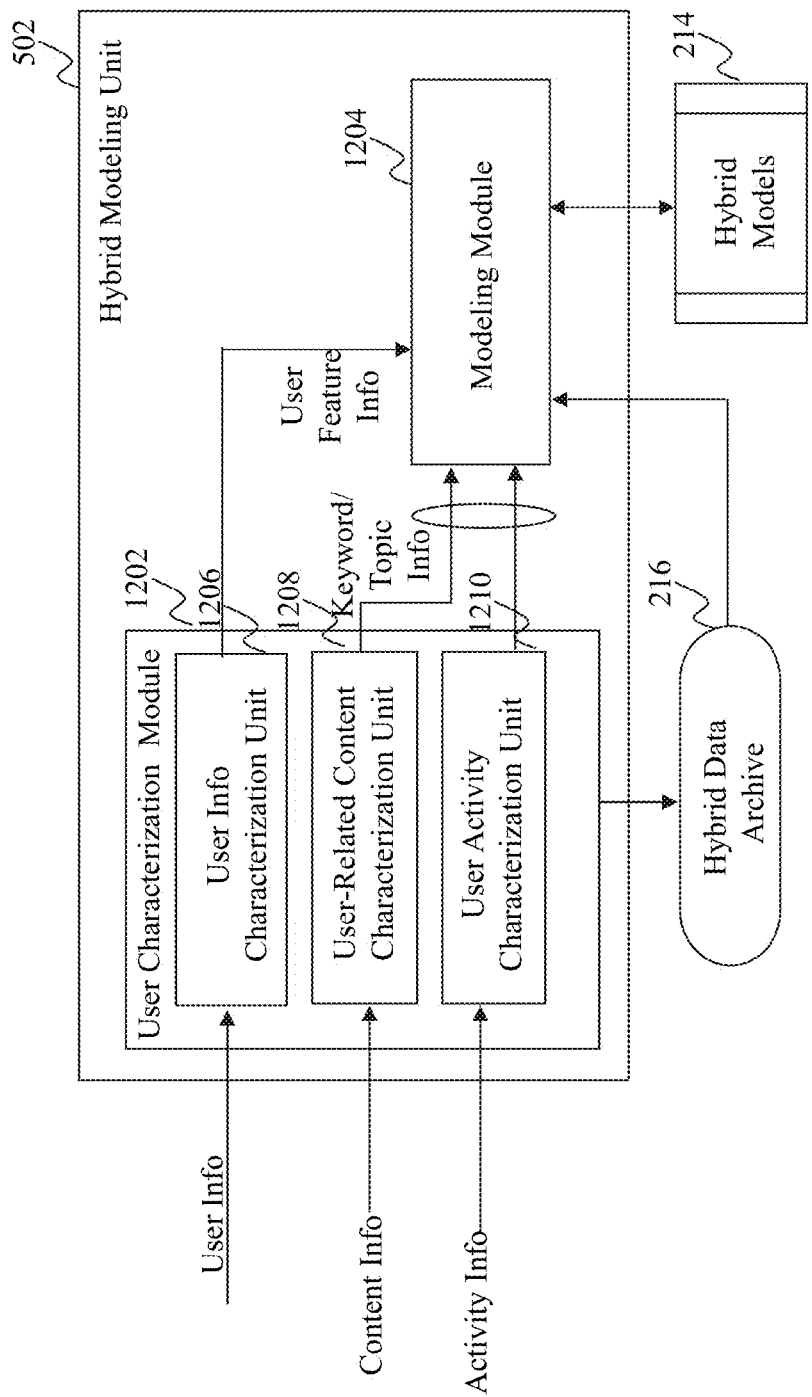
FIG. 12 is a system diagram for an exemplary hybrid modeling unit of the hybrid query engine, according to an embodiment of the present teaching.

FIG. 12 is a system diagram for an exemplary hybrid modeling unit of the hybrid query engine, according to an embodiment of the present teaching. The hybrid modeling unit 502 in this example includes a user characterization module 1202 and a modeling module 1204. The user characterization module 1202 in this example includes three units, each of which is responsible for processing one type of hybrid information. The user-related content and user activities in the hybrid information are characterized by the user-related content characterization unit 1208 and user activity characterization unit 1210, respectively, and are converted to topic/keyword information (e.g., represented by a topic/keyword matrix). The user profile (attributes) is characterized and converted to user feature information (e.g., represented by a user attribute matrix) by the user information characterization unit 1206. Both the user feature information and topic/keyword information are fed into the modeling module 1204 to generate hybrid recommendation models 214. As noted above, the user profile and user-related content and activities may be dynamically monitored and collected by hybrid information fetcher 504. In addition, each new user, upon signing-up to the system, may provide basic user profile through the user sign in module 506 (not shown here).

The modeling module 1204 is configured to establish hybrid models 214, such as a model that maps from users to topics of interest based on the topic information and user feature information fed from the user characterization module 1202. In this example, the model may be established based on a user attribute matrix representing user features with respect to all existing users and a topic/keyword matrix representing topics/keywords with respect to the existing users. It is noted that the information to be fed to the modeling module 1204 may be selected in a manner to reduce the dimensionality of the user attribute matrix or topic/keyword matrix in order to be computationally competitive. Such selected information may be the most relevant at the time of the selection. Due to the fact that interests or context of user's environment may change over time, other collected data may be still stored so that when needed, certain information can be retrieved and used when, e.g., the model needs to be drastically refined. For example, over time, a user's interest may change. This may be observed when recommended content has not been selected by the user. In this case, topics associated with such unselected content may be removed from the topic/keyword matrix and new interests may be retrieved to replace the staled interests. It is understood that the dimension of the content feature matrix is usually reduced because of the large amount of keywords data. As to the user feature matrix, whether the dimension reduction should be performed is a design choice made case by case.

Figure 13A:
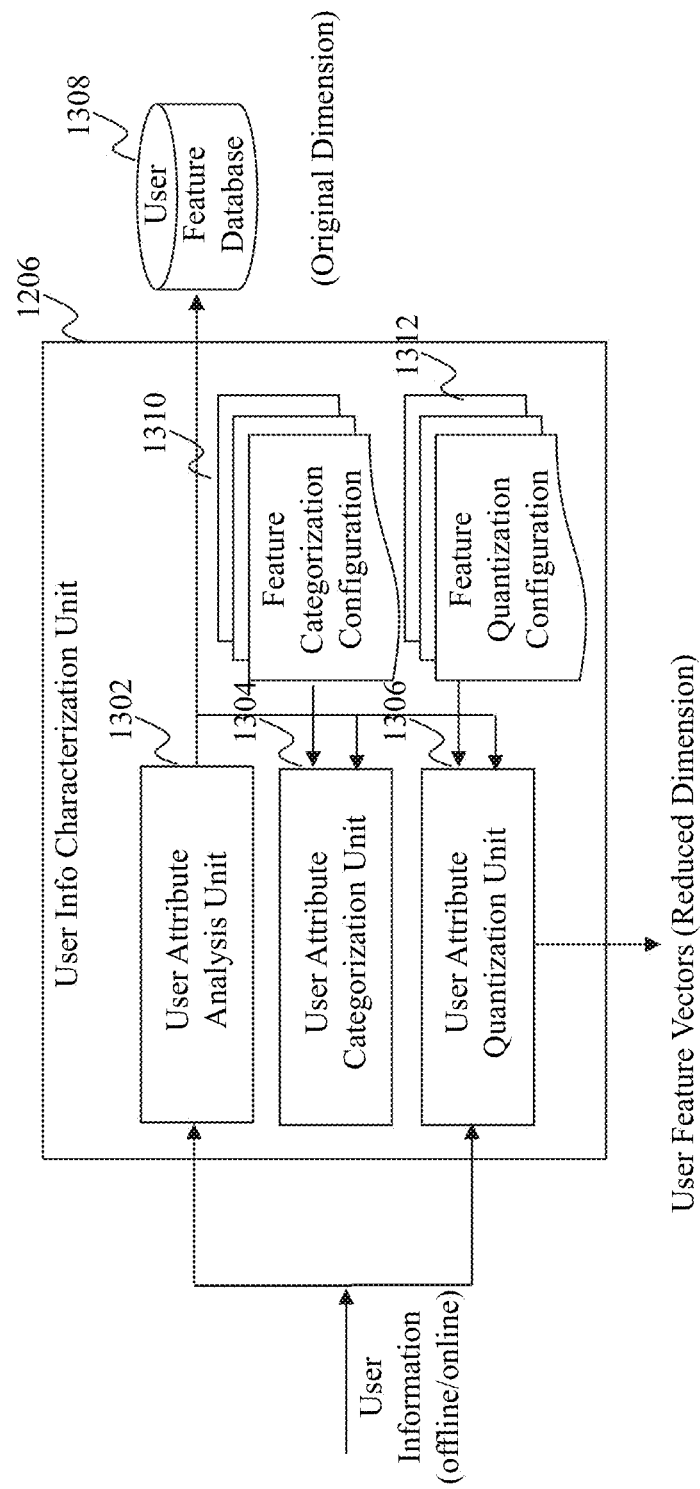
FIG. 13(a) is a system diagram for an exemplary user information characterization unit of the hybrid modeling unit, according to an embodiment of the present teaching.

FIG. 13(*a*) is a system diagram for an exemplary user information characterization unit of the user characterization module, according to an embodiment of the present teaching. The user information characterization unit 1206 may include a user attribute analysis unit 1302, a user attribute categorization unit 1304, and a user attribute quantification unit 1306. The user attribute analysis unit 1302 is responsible for extracting basic user attributes from received user profiles. The features extracted by the user attribute analysis unit 1302 may be represented as a feature vector for each user, and all the feature vectors may be directly saved in the feature database 1308 without any dimension reduction process. In other words, the feature database 1308 in this example stores feature vectors in their original dimensions. The user information characterization unit 1206 generates user feature information, which may be represented as an m×n matrix, with rows corresponding to users and columns corresponding to user features in a reduced dimension. To reduce computational complexity, the dimension of user feature vectors in the matrix may be reduced by the user attribute categorization unit 1304 and user attribute quantification unit 1306 compared with the original dimension of feature vectors stored in the feature database 1308.

The user attribute categorization unit 1304 is configured to derive categorical features for each user base on correlation of its values with content interests, i.e., predefined feature categorization configuration 1310. In one example, for "city" attribute, features such as whether it is from first-tier cities such as Beijing, Shanghai, the Internet penetration rate of that city, etc., may be derived by the user attribute categorization unit 1304. In another example, for "university/department" attribute, derived features may include whether the department is technology, art, or science, the tier of the university, etc. The user attribute quantification unit 1306 is configured to quantify each attribute into value ranges according to data analysis, i.e., predefined feature quantification configuration 1312. In one example, for "birthday" attribute, it may be quantified by the user attribute quantification unit 1306 into predefined age groups, such as 20+, 40+, 60+, etc. Also, "birthday" attribute may be quantified to derive two other features: constellation and Chinese Zodiac. Based on astrology and numerology, features such as a user's personality may be interred based on his/her constellation and Chinese Zodiac, which may be further combined with other features to infer the user's possible social roles and topics of interest. In still another example, statistical data-driven approaches may be applied to feature quantification. For example, topics may be considered as labels and attributes may be considered in their real values as features. The effective feature quantification then may be obtained from the data according to the cut-off values of each attribute in a decision tree classifier. Eventually, the user feature vectors in a reduced dimension are outputted. As noted above, the user feature vectors include features extracted from users' offline information, which reflect users' long-term and generic interest, features representing users' attributes (e.g., gender, age), which are especially useful for inactive users, and features extracted from online user information at a run-time per user signs-in, which reflect users' short-term interest.

Figure 13B:
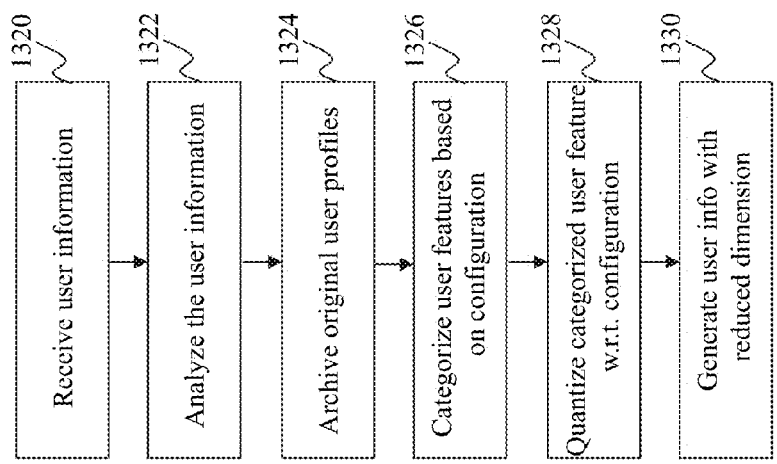
FIG. 13(b) is a flowchart of an exemplary process of the user information characterization unit, according to an embodiment of the present teaching.

FIG. 13(b) is a flowchart of an exemplary process of the user information characterization unit, according to an embodiment of the present teaching. Starting from block 1320, hybrid user information, whether it is online or offline information, is received by the user information characterization unit 1206. The user information is then analyzed at block 1322 by the user attribute analysis unit 1302 to extract original user profiles. The original user profiles may be archived in the feature database 1308 at block 1324 for future use, such as model refinement. Proceeding to block 1326, user features may be categorized to derive features based on predefined feature categorization configuration. At block 1328, categorical user features may be further quantified with respect to predefined feature quantification configuration to reduce the dimension of the user feature vectors. Eventually, at block 1330, user feature information with a reduced dimension is generated by the user information characterization unit 1206.

Figure 14A:
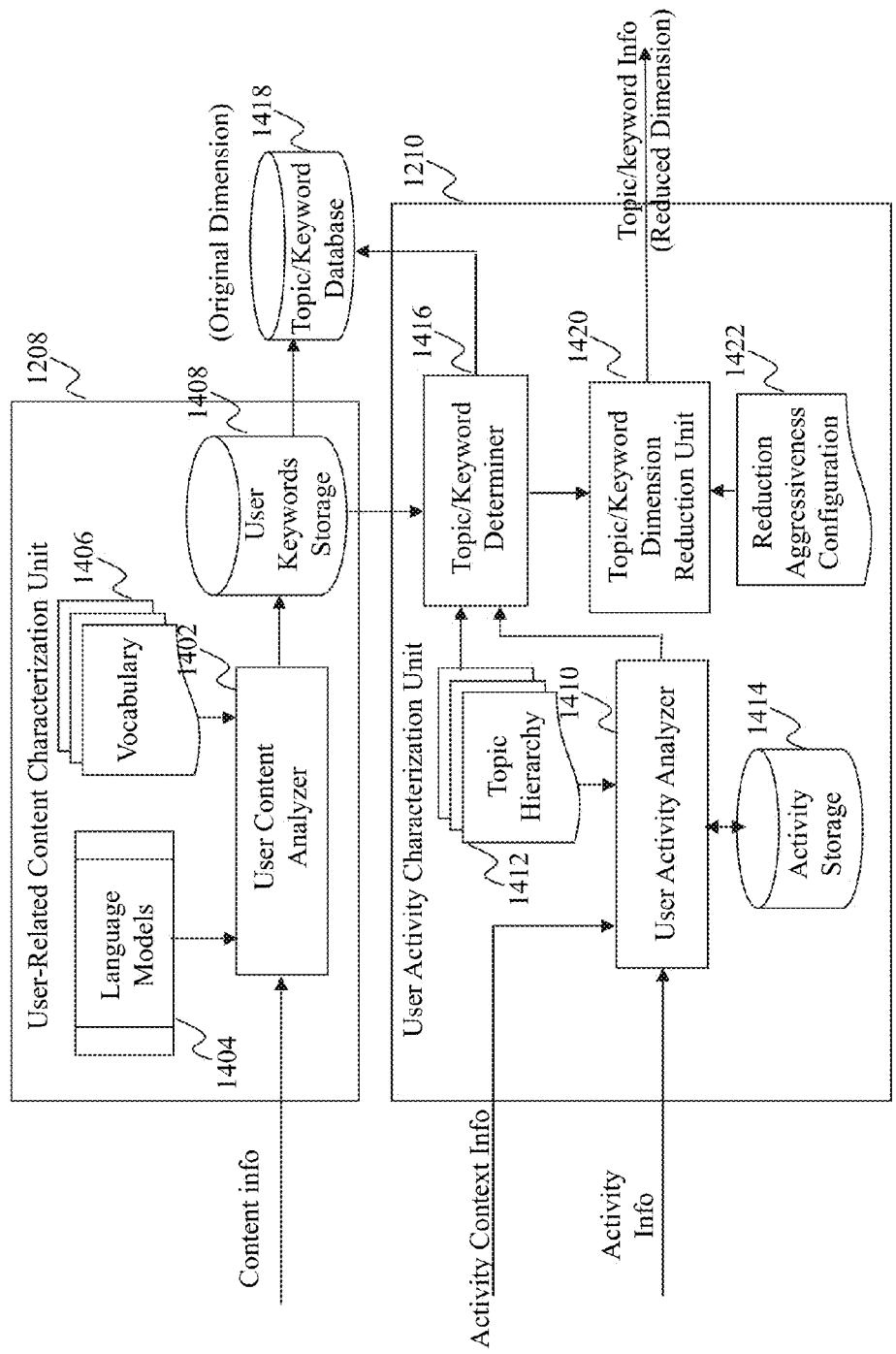
FIG. 14(a) is a system diagram for an exemplary user-related content characterization unit and user activity characterization unit of the hybrid modeling unit, according to an embodiment of the present teaching.

FIG. 14(a) is a system diagram for an exemplary user-related content characterization unit and user activity characterization unit of the user characterization module, according to an embodiment of the present teaching. The user-related content characterization unit 1208 and user activity characterization unit 1210 are responsible for generating topic/keyword information that indicates each user's interest profile. The topic/keyword information may be represented as an m×h topic/keyword matrix, with rows corresponding to users and columns corresponding to topics/keywords in a reduced dimension.

The user-related content characterization unit 1208 may include a user content analyzer 1402 responsible for performing keywords selection from the hybrid content information based on language models 1404 and vocabulary 1406 and storing the extracted keywords in a user keywords storage 1408. As discussed above, the content information may be any online or offline content consumed or contributed by the user, such as news, articles, events, blogs, social updates, etc. The user content analyzer 1402 may apply any known language models to extract keywords and/or identify topics of interest from the content, e.g., by feature selection methods in text classification, such as document frequency (how many documents in the corpus a word occurs in), mutual information, information gain, chi-square, etc. All those feature selection methods may help selecting of the most indicative keywords or key phrases from various candidate keywords with respect to any predefined category (topic of interest) from the hybrid content information.

The user activity characterization unit 1210 may include a user activity analyzer 1410 responsible for analyzing the user's activity information based on activity context information and topic hierarchy 1412. Optionally, all the collected user activities may be stored in an activity storage 1414 for future use. The activity context information indicates the context of each user activity, such as the time when the activity occurs, the site where the activity happens, etc., which may have different weights when different user activities are aggregated. Additionally, an user action, such as "click," is conventionally considered as a typical activity. In this example, "forward" is also an activity that can be observed and used to infer interests. Activities link content to an action and such activities reflect the interest of a user to the content. Different activities may weight that interest differently. For example, if a user clicks on a document, it may reflect the fact that the user likes the content. If the activity is "forward," this activity weighs more, i.e., there is a stronger degree of like associated with the user, e.g., "like it very much." Furthermore, if the user even commented on the content (another activity), it may indicate that the user likes the content a lot because the user actively participated in contributing to the peripheral of the content.

The user activity characterization unit 1210 may also include a topic/keyword determiner 1416 configured to determine topics of interest based on the user activities, the extracted keywords from the user keywords storage 1408, and the topic hierarchy 1412. In one example, the activities and keywords may be classified under predefined topics in terms of the same taxonomy in the topic hierarchy 1412 by any known classifier. For example, activities and keywords related to the same user may be aggregated through weighted linear combination into a single topic vector. In addition to explicit interests, as noted above, topics of interest for each user may be also inferred as implicit interests by topic propagation methods in a social network setting. The determined topics of interest may be represented as a real-value vector (i.e., a vector of weights with respect to keywords and topics) for each user and stored in a topic/keyword database 1418 in their original dimensions. In order to reduce the dimension of topics/keywords in the topic/keyword matrix, a topic/keyword dimension reduction unit 1420 may be applied in conjunction with predefined reduction aggressiveness configuration 1422. In one example, known feature selection methods in text classification may be applied to calculate scores for each <topic, keyword> pair. The scores are then used to rank all the keywords for each topic. By setting a threshold on the scores or the number of keywords selected for each topic, the dimension of the topic vectors may be reduced. For example, keywords such as "football," "basketball," "Michael Jordan," or "NBA," may be considered as the most indicative keywords for "sports" topic and thus, are included in the topic/keyword matrix.

Figure 14B:
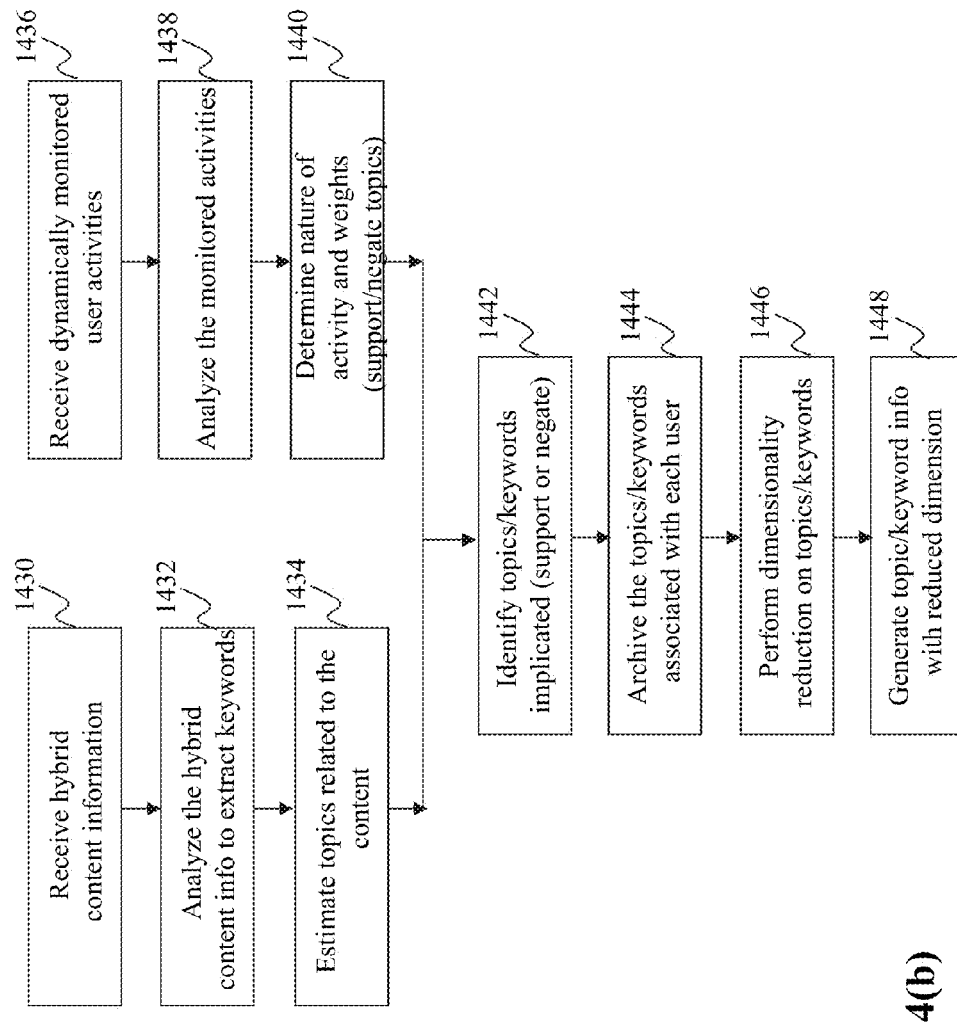
FIG. 14(d) is a flowchart of an exemplary process of the user-related content characterization unit and user activity characterization unit, according to an embodiment of the present teaching.

FIG. 14(b) is a flowchart of an exemplary process of the user-related content characterization unit and user activity characterization unit, according to an embodiment of the present teaching. At block 1430, hybrid content information is received by the user-related content characterization unit 1208. At block 1432, the received content is analyzed to extract keywords based on language models and vocabulary. Topics of interest related to the received hybrid content information are then estimated at block 1434 by, for example, statistical classifiers. At block 1436, user activity information is also received by the user activity characterization unit 1210. The received activities are analyzed at block 1438, and their natures, such as whether an activity supports or negates a topic, are determined at block 1440. Implicit topics of interest (e.g., supporting or negating a topic) may be identified at block 1442 based on the estimated topics and determined natures of activities. Proceeding to block 1444, all the identified topics associated with each user, whether explicit or implicit, may be archived in the topic/keyword database 1418. At block 1446, dimensionality reduction may be performed to reduce the dimension of topics in the topic/keyword matrix. Eventually, at block 1448, topic information with a reduced dimension is generated by the user-related content characterization unit 1208 and user activity characterization unit 1210.

Figure 15A:
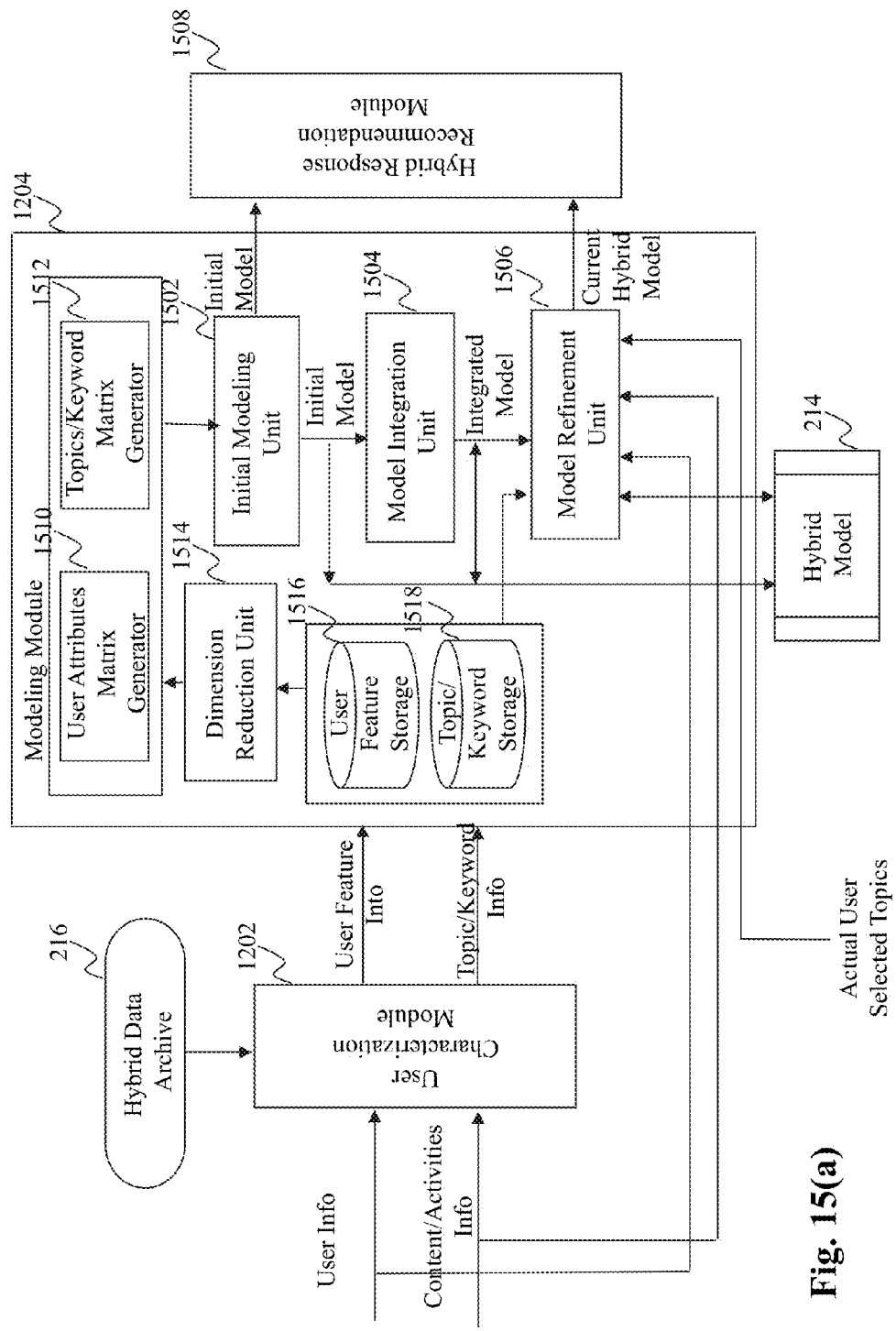
FIG. 15(a) is a system diagram for an exemplary modeling module of the hybrid modeling module, according to an embodiment of the present teaching.

FIG. 15(*a*) is a system diagram for an exemplary modeling module, according to an embodiment of the present teaching. In this example, the modeling module 1204 includes an initial modeling unit 1502, a model integration unit 1504, and a model refinement unit 1506. The initial modeling unit 1502 is configured to provide an initial model to a hybrid response recommendation module 1508 based on, for example, a user attribute matrix and a topic/keyword matrix of the existing users. In this example, the modeling module 1204 further includes a user attribute matrix generator 1510 and a topic/keyword matrix generator 1512. As noted above, the user characterization module 1202 may be responsible for providing the user attribute matrix and topic/keyword matrix in the user feature information and topic/keyword information, respectively. In this example, a dimension reduction unit 1514 may be employed by the modeling module 1204 to reduce dimensions of the feature vectors and topic vectors that are stored in a user feature database 1516 and a topic/keyword database 1518, respectively, in their original dimensions. The user attribute matrix generator 1510 and topic/keyword matrix generator 1512 then combine user feature vectors and topic/keyword vectors for all existing users to generate the user attribute matrix and topic/keyword matrix, respectively.

The model integration unit 1504 is configured to generate an integrated model by continuously appending the information of each new user (e.g., new user profile, estimated topics of interest) to the user attribute and topic/keywords matrices of the existing model. Given that online activities continuously occur and change, the model refinement unit 1506 is responsible for dynamically refining the hybrid recommendation models 214 based on dynamic user-related content and activities and characterized user features and topics of interest. In addition, the discrepancy between the estimated topics and the actual user selected content may be used by the model refinement unit 1506 to adjust the current recommendation model. It is noted that whether a user selects or not selects a piece of suggested content is part of the dynamic behavior of the user or user's activity. The up-to-date hybrid model may be always provided to the topic estimation module 412 for topics stimulation.

In addition to the above-mentioned user attribute matrix and topic/keyword matrix, latent variables may be derived by joint matrix factorization, such as singular value decomposition, from various matrices, including user-user matrices of all kinds of relationships, user-document matrices of all kinds of relationships, document-keyword matrix, user-keyword matrix (extracted from user self-tags and explicitly subscribed keywords, for example), etc.

Through the user attribute matrix and topic/keyword matrix, various relationships can be derived. For example, through joint matrix factorization, user to user relationships may be inferred by identifying users who have similar attributes and interests by identifying rows in both matrices that are similar. For example, similar rows in the user attribute matrix correspond to users who have similar attributes. Similar rows in the topic/keyword matrix correspond to users who share similar interests. Users who are similar in both matrices may be those who are similar in attributes and share common interests. Via those matrices, one can identify both users who are implicitly related, e.g., who, although never met and never communicated, are nevertheless related via common interests. Based on such matrices, a user-user matrix may be constructed reflecting the relationship between users, either explicit or implicit. For instance, for any user, a matrix may be built with rows corresponding to other users considered to be related to the user. Those identified related users can be those to whom the user sends or forwards articles, documents or any other information in certain topics to friends. Those friends are clearly or explicitly related to the user. Inversely, the identified users as being related to the user can be those who send or share content to the user. Those are users who are explicitly related and can be identified through monitored user's activities. At the same time, by identifying similar rows in the user attribute matrix, users, possibly not known to each other, may be identified as implicitly related by having similar attributes. In addition, by detecting similar rows in the topic/keyword matrix, users, possibly not known to each other at all, who share common interest may be identified. Such users who do not know each other yet identified as similar are implicitly related and can be added to the user-user matrix to record all possible, explicit or implicit, related users. In this matrix, for each pair of relationship, e.g., say between a first user a second user, it may be marked as to how they are related. For example, the columns of the user-user matrix may correspond to attribute, different topics/keywords, or social connections such as via different social groups. Through those means, people who are either explicitly or implicitly related to a particular user may be identified, and such information can be consolidated in a user-user matrix that will enable any types of user to user query.

Similarly, one can also explicitly construct user-document matrices. For example, for each user, any document that the user explicitly accesses may be included in such a matrix. In addition, documents that can be inferred via implicit relationship may also be included. For example, if there are other users who are considered to be related to the user, e.g., on certain shared interests, any documents accessed by those other users, may also be included in the user-document matrix, with, e.g., an indication as to the source of the document and how it is related. For each of such document, some characterization, e.g., a topic, may be recorded to facilitate user to document recommendation. This matrix is constantly adjusted. Documents that have not been accessed for a while or explicitly rejected by the user may be removed. New documents can be added based on monitored online activities. In this way, the recommended content to the user can be kept fresh and updated.

Furthermore, additional matrices may also be constructed to organize the vast amount of information collected or observed. For example, a document-keyword matrix may be constructed in which for each document, various keywords may be extracted based on the importance of the words in the document, as discussed before. This can be done using any known technologies. Each document in such a matrix may have cross index to, say, the document cited in the user-document matrix. Similarly, each user in the user-document matrix may be cross-indexed to the users listed in the user-user matrix. In this manner, information in each matrix is targeted for certain mapping but through the cross indices across different matrices, complex relationships and additional information can be mined and derived.

Figure 15B:
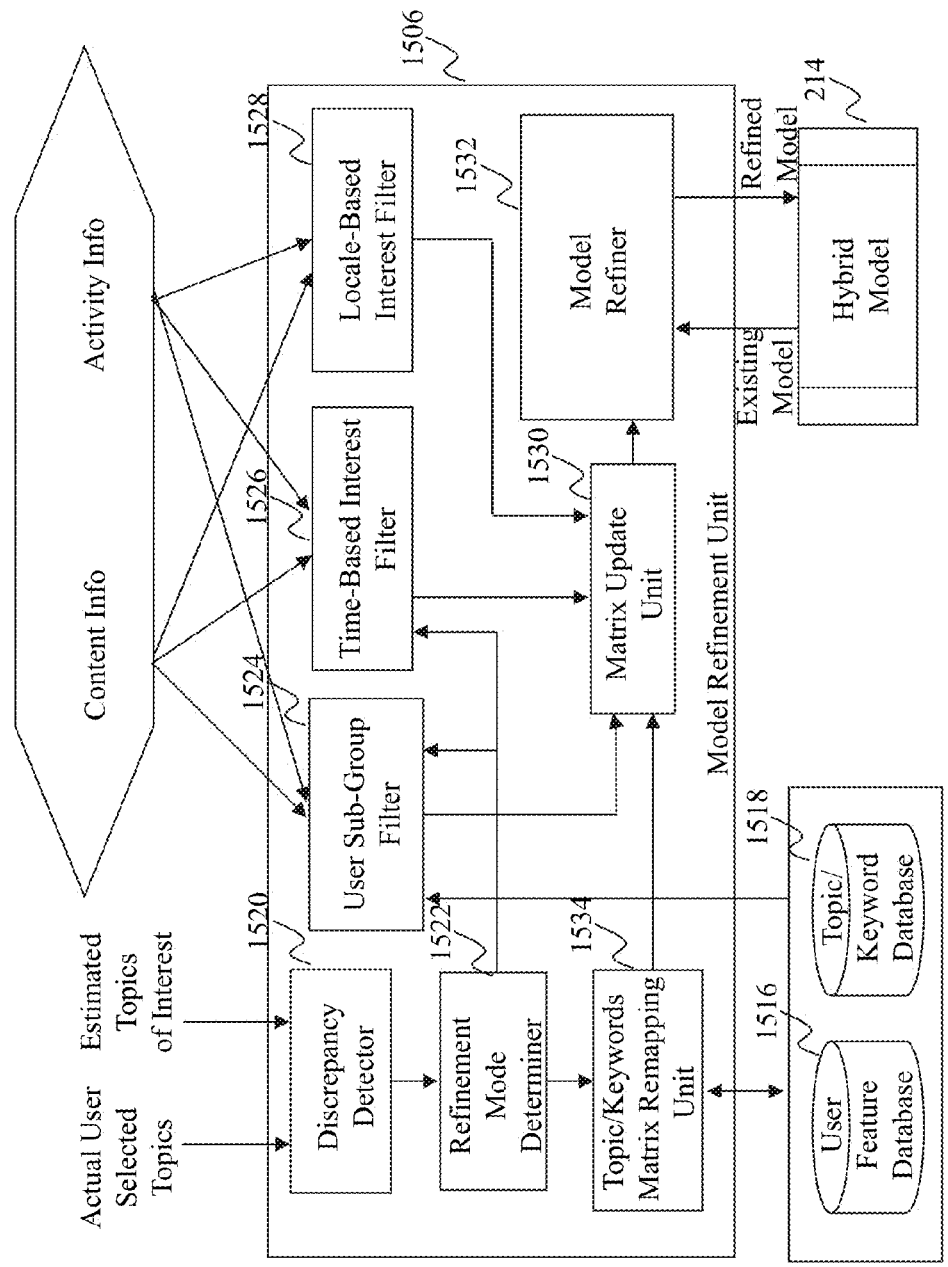
FIG. 15(b) is a system diagram for an exemplary model refinement unit of the modeling module, according to an embodiment of the present teaching.

FIG. 15(b) is a system diagram for an exemplary model refinement unit of the modeling module, according to an embodiment of the present teaching. In this example, the model refinement unit 1506 includes a discrepancy detector 1520, a refinement mode determiner 1522, a user subgroup filter 1524, a time-based interest filter 1526, a location-based interest filter 1528, a matrix update unit 1530, and a model refiner 1532. As noted above, discrepancy between the estimated topics and the actual user selected topics may be detected and analyzed by the discrepancy detector 1520. Depending on the degree of discrepancy, the refinement mode determiner 1522 is responsible for deciding a mode in which the model refinement will be conducted. In one example, if the discrepancy is below a threshold value, a gradual refinement mode may be selected. The matrix update unit 1530 then updates the user attribute matrix and topic matrix based on the dynamically monitored user information. In another example, if the discrepancy is above a threshold value, which means the estimated topics of interest are not what the user expects, a topic/keyword matrix remapping unit 1534 may be employed to update the topic/keyword matrix by swapping the estimated topics out of the topic/keyword matrix.

In still another example, hierarchical models with sub-models may be applied to further refine the hybrid recommendation model 214. For example, hierarchical models based on different time frames or locations may be applied by the time-based interest filter 1526 and location-based interest filter 1528 to collect only user-related content and activities that fit into a specific time frame or location for each user. For example, a user on week days and weekend/evening times may have different interested topics when online. Sub-models for each user may be divided into such time frames and used accordingly depending on the time at which a recommendation needs to be made. Similarly, sub-models based on user subgroups may be applied by the user subgroup filter 1524 to collect only content and activities of users in a specific subgroup. More similar users may be grouped together to more precisely model the interests of this subgroup. The hierarchical models applied by the user subgroup filter 1524, time-based interest filter 1526, or location-based interest filter 1528 may be fed into the matrix update unit 1530 to cause the model refiner 1532 to adjust the hybrid recommendation models 214. For example, the initial model may be divided into sub-models with respect to time, location or user, as noted above. The model refiner 1532 may further generate sets of sub-matrices for the sub-models and establish recommendation models using the new sub-matrices.

Figure 15C:
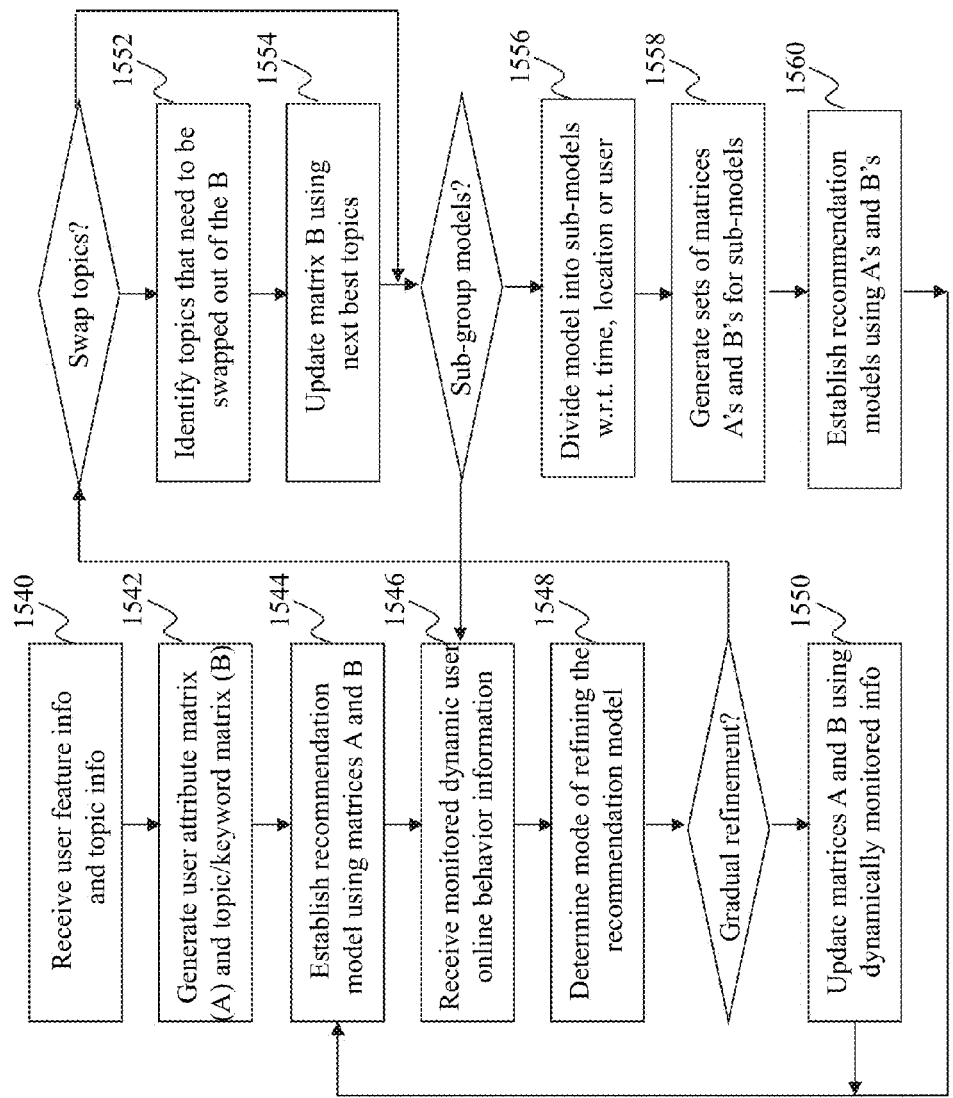
FIG. 15(c) is a flowchart of an exemplary process of the modeling module, according to an embodiment of the present teaching.

FIG. 15(c) is a flowchart of an exemplary process of the modeling module, according to an embodiment of the present teaching. Starting from block 1540, user feature information and topic information are received by the modeling module 1204. At block 1542, a user attribute matrix and a topic/keyword matrix are generated based on the received user feature information and topic/keyword information. A recommendation model is then established at block 1544 using the user attribute matrix and topic/keyword matrix. Proceeding to block 1546, dynamic user online behavior information such as dynamic user-related content and user activities are continuously monitored and received by the model refinement unit 1506. At block 1548, the mode for refining the recommendation model is determined. If a gradual refinement mode is chosen, at block 1550, the user attribute matrix and topic/keyword matrix are updated by the model refinement unit 1506 using the dynamically updated user information. If estimated topics of interest provided by the current recommendation model are deemed to be undesired at block 1552, the topic/keyword matrix may be updated using the next-best topics at block 1554. Otherwise, a hierarchical model may be applied to adjust the current recommendation model. At block 1556, the current recommendation model may be divided into sub-models with respect to time, location or user. New sets of user attribute sub-matrices and topic sub-matrices may be generated at block 1558 for the divided sub-models. Eventually, at block 1560, a refined recommendation model may be established using the new sets of user attribute sub-matrices and topic sub-matrices.

Figure 16:
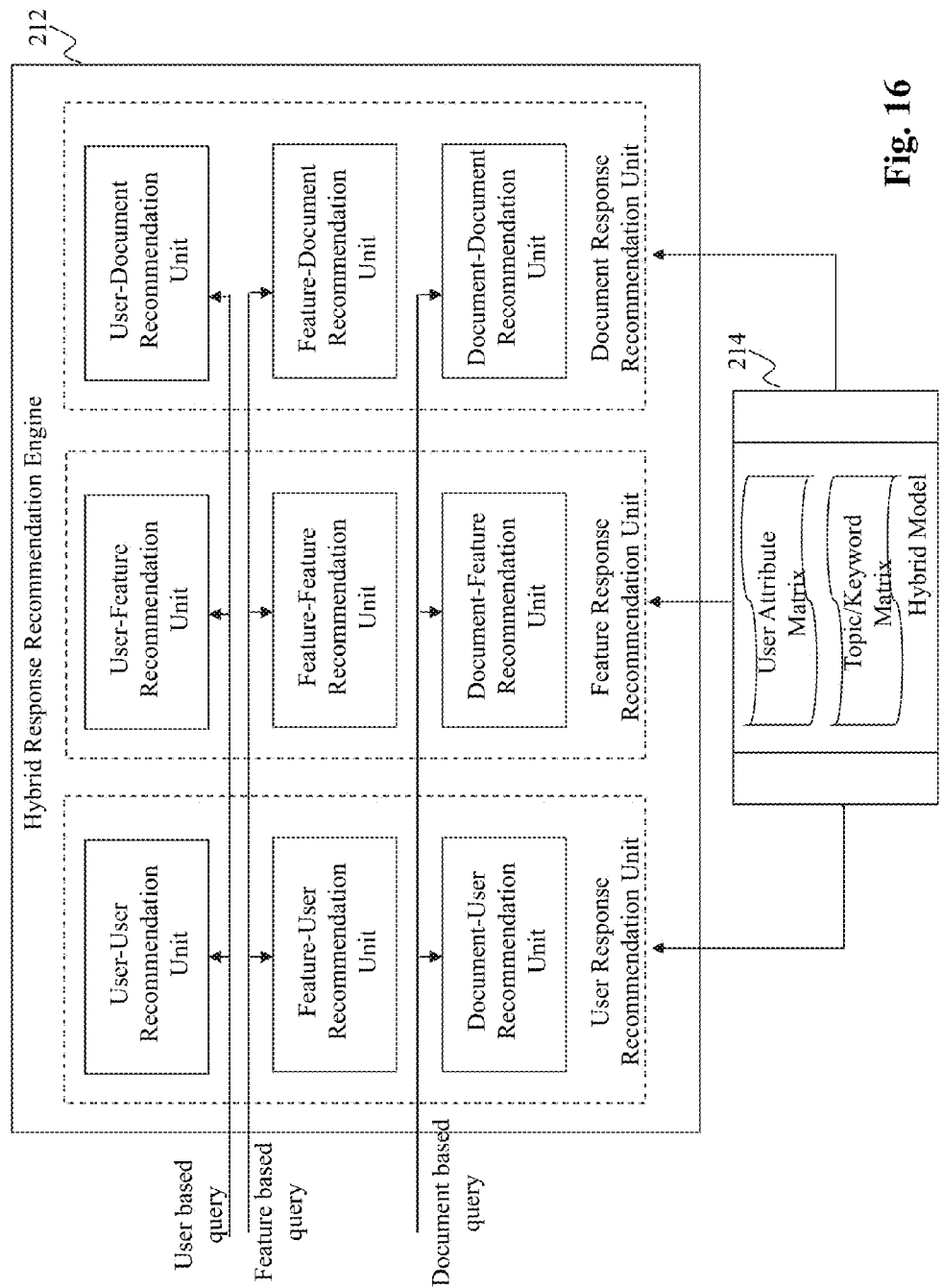
FIG. 16 is a system diagram for an exemplary hybrid response recommendation engine of the hybrid query engine, according to an embodiment of the present teaching.

FIG. 16 is a system diagram for an exemplary hybrid response recommendation engine of the hybrid query engine, according to an embodiment of the present teaching. As discussed above, a nine-way query-result matching may be performed by a corresponding recommendation unit in the hybrid response recommendation engine 212 based on the hybrid recommendation model 214. In this example, each recommendation unit may perform a lookup operation by following proper indices. In one example, if a user-based query is requested to search for other relevant users, the user-user recommendation unit may perform a lookup operation based on the indices with respect to the user in the query input, in particular, user-user indices. As discussed above, each index may have a labeled on it, which facilitates the lookup operation during search and recommendation. For user-user indices, the label may be for example, "sharing an explicit or implicit common interest," "in the same social group," etc. In another example, if a document-based query is requested to search for users, the document-user recommendation unit may perform a lookup operation by following proper document-user indices with labels such as "contributing to the same document," or "likely interested in the topic of the document," etc. The index-based operation may greatly reduce latency for recommendation as all the indexing operations are continuously performed offline, and the indices are stored for quick retrieval. To balance latency and accuracy, it is noted that online hybrid information including online user information, content information, and activity information, which are captured from the user's private data when the user is online, may be utilized to real-time adjust the query result obtained based on the indices. In other words, real-time, specific context information may influence the final query result provided to the user. In one example, the user-user recommendation unit may identify several relevant users as possible query results for a user to user query based on user-user indices. However, the online user activity information indicates that the user just stopped following one of the relevant users in its social network. In this case, the hybrid response recommendation engine 212 may adjust the query result by removing that user in real-time.

Figure 17:
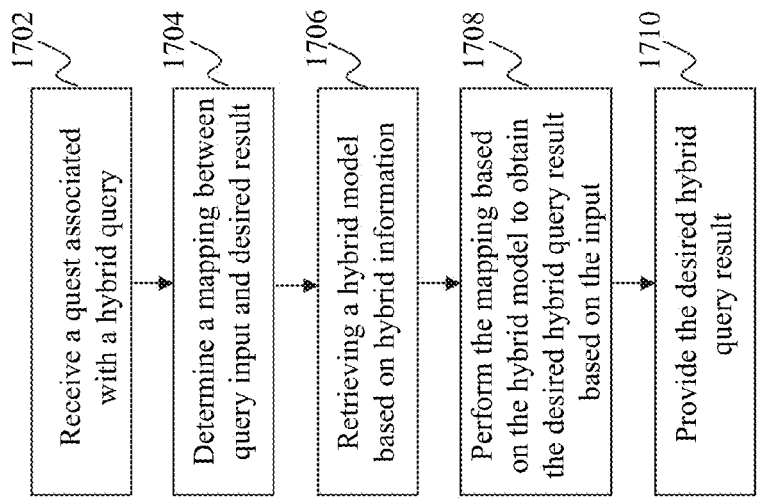
FIG. 17 is a flowchart of an exemplary process of the hybrid response recommendation engine, according to an embodiment of the present teaching.

FIG. 17 is a flowchart of an exemplary process of the hybrid response recommendation engine, according to an embodiment of the present teaching. Starting from block 1702, a request associated with a hybrid query is received by the hybrid response recommendation engine 212. The hybrid query is expressed in accordance with an input in terms of one of a user, a feature, and a document, and a desired hybrid query result in terms of one of a user, a feature, and a document. At block 1704, a mapping between the input and the desired hybrid query result is determined. A hybrid model established based on hybrid information collected and associated with one or more users is then retrieved at block 1706. Proceeding to block 1708, the mapping is performed based on the hybrid model to obtain the desired hybrid query result based on the input. Eventually, at block 1710, the desired hybrid query result is provided as a response to the hybrid query.

Figure 18A:
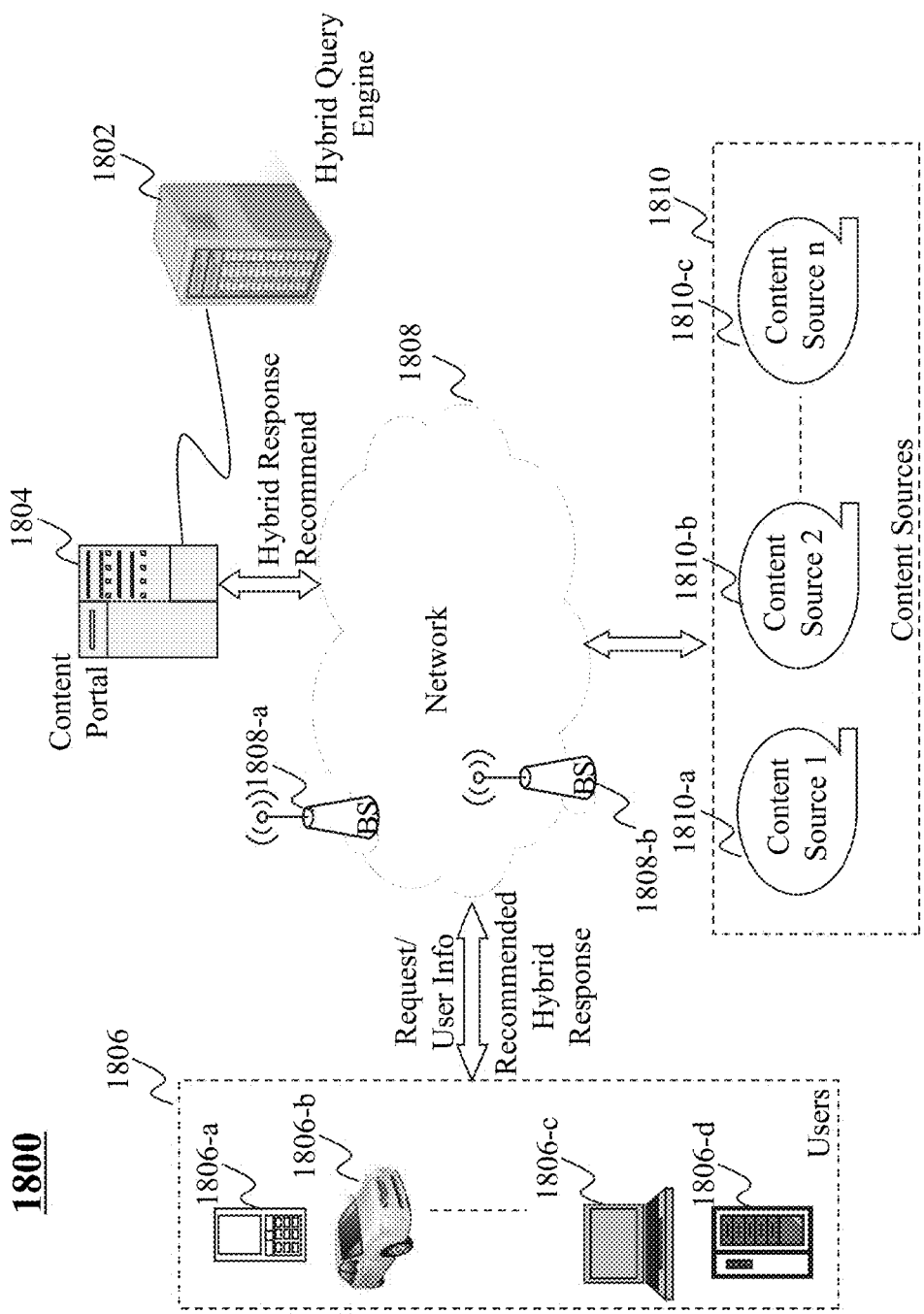
FIGS. 18(a) and 18(b) depict exemplary embodiments of a networked environment in which hybrid information query is applied, according to different embodiments of the present teaching.
Figure 18B:
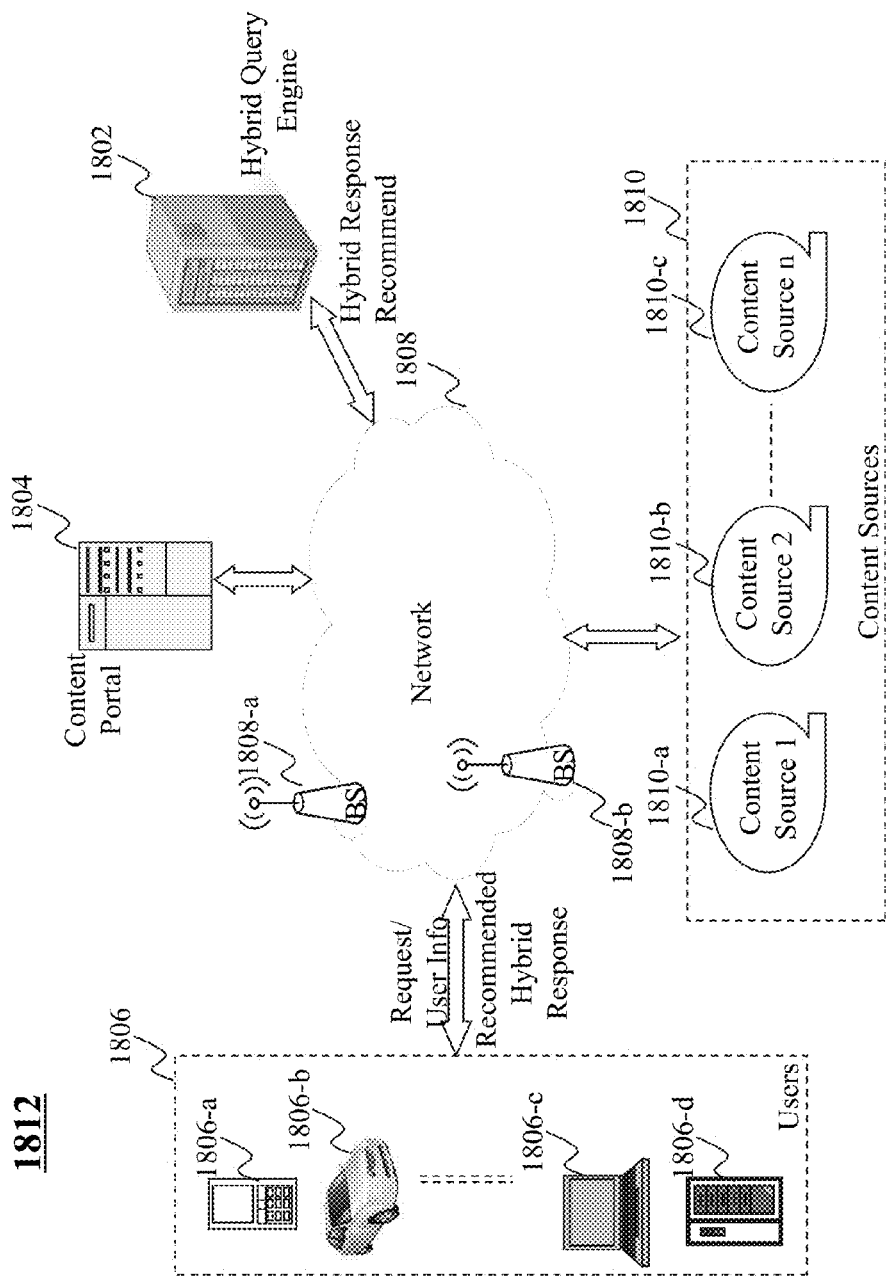

FIGS. 18(*a*) and 18(*b*) depict high level exemplary system configurations in which hybrid information query is performed, according to different embodiments of the present teaching. In FIG. 18(*a*), the exemplary system 1800 includes a hybrid query engine 1802, a content portal 1804, users 1806, a network 1808, and content sources 1810. The network 1808 may be a single network or a combination of different networks. For example, the network 1808 may be a local area network (LAN), a wide area network (WAN), a public network, a private network, a proprietary network, a Public Telephone Switched Network (PSTN), the Internet, a wireless network, a virtual network, or any combination thereof. The network 1808 may also include various network access points, e.g., wired or wireless access points such as base stations or Internet exchange points 1808-*a*, . . . , 1808-*b*, through which a data source may connect to the network in order to transmit information via the network.

Users 1806 may be of different types such as users connected to the network 1808 via desktop connections (1806-*d*), users connecting to the network 1808 via wireless connections such as through a laptop (1806-*c*), a handheld device (1806-*a*), or a built-in device in a motor vehicle (1806-*b*). A user 1806 may send a request associated with a hybrid information query and user information to the content portal 1804 (e.g., a search engine, a social network site, etc.) via the network 1808 and receive recommended hybrid response from the content portal 104 through the network 1808. The hybrid query engine 1802 in this example may work as backend support to provide a desired hybrid query result to the content portal 1804 based on the hybrid query in the request from the user 1806. That is, the content portal 1804 in this example may be an entity that uses the hybrid query engine 1802 as a vendor to process a hybrid information query in the user request. The request from the content portal 1804 includes the hybrid query from the user 1806 while the result from the hybrid query engine 1802 passes on the output to the content portal 1804.

The content sources 1810 include multiple content sources 1810-*a*, 1810-*b*, . . . , 1810-*c*. A content source may correspond to a web site hosted by an entity, whether an individual, a business, or an organization such as USPTO.gov, a content provider such as cnn.com and Yahoo.com, a social network website such as Facebook.com, or a content feed source such as tweeter or blogs. Both the hybrid query engine 1802 and content portal 1804 may access information from any of the content sources 1810-*a*, 1810-*b*, . . . , 1810-*c* to obtain dynamic hybrid information related to the users 1806. For example, the hybrid query engine 1802 may monitor and gather dynamic user-related content and activities and user profile from the content sources 1810 and use information as the basis for continuously updating the recommendation model for providing up-to-date hybrid query results.

FIG. 18(*b*) presents a similarly system configuration as what is shown in FIG. 18(*a*) except that the hybrid query engine 1802 is now configured as an independent service provider that interacts with the users 1806 directly to provide hybrid information query service. In the exemplary system 1812, the hybrid information recommendation 102 may receive a request with basic information from a user 1806 and/or dynamic content associated with user 1806 and provide desired hybrid query results to the user 1806 directly without going through a third-party content portal 1804.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the DCP processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

FIG. 19 depicts a general computer architecture on which the present teaching can be implemented and has a functional block diagram illustration of a computer hardware platform that includes user interface elements. The computer may be a general-purpose computer or a special purpose computer. This computer 1900 can be used to implement any components of the hybrid information query architecture as described herein. Different components of the system 200 can all be implemented on one or more computers such as computer 1900, via its hardware, software program, firmware, or a combination thereof. Although only one such computer is shown, for convenience, the computer functions relating to hybrid information query may be implemented in a distributed fashion on a number of similar platforms, to distribute the processing load.

The computer 1900, for example, includes COM ports 1902 connected to and from a network connected thereto to facilitate data communications. The computer 1900 also includes a central processing unit (CPU) 1904, in the form of one or more processors, for executing program instructions. The exemplary computer platform includes an internal communication bus 1906, program storage and data storage of different forms, e.g., disk 1908, read only memory (ROM) 1910, or random access memory (RAM) 1912, for various data files to be processed and/or communicated by the computer, as well as possibly program instructions to be executed by the CPU 1904. The computer 1900 also includes an I/O component 1914, supporting input/output flows between the computer 1900 and other components therein such as user interface elements 1916. The computer 1900 may also receive programming and data via network communications.

Hence, aspects of the method of hybrid information query, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine, each of which has at least one processor, storage, and a communication platform connected to a network for hybrid information query, comprising the steps of:
   receiving a request from a user associated with a hybrid query, wherein the hybrid query is expressed in accordance with an input in terms of one of a user, a feature, and a document, and a desired hybrid query result in terms of one of a user, a feature, and a document;
   determining a mapping between the input and the desired hybrid query result;
   retrieving a hybrid model established based on hybrid information collected and associated with one or more users,
   wherein the hybrid model is established by:
      analyzing the hybrid information to identify one or more explicit relationships in the hybrid information and to derive one or more implicit relationships among the one or more users based on the hybrid information; and
      indexing the hybrid information based on the explicit and implicit relationships with respect to each of the one or more users;
   performing the mapping based on the hybrid model to obtain the desired hybrid query result based on the input; and
   providing the desired hybrid query result as a response to the hybrid query.

2. The method of claim 1, wherein the hybrid information collected and associated with one or more users includes at least one of:
   static user information about the one or more users;
   static content information associated with usage of such content by the one or more users;
   activity information associated with online activities of the one or more users;
   dynamic user information related to a dynamic online context surrounding the one or more users when they are online;
   dynamic content information collected online with respect to the one or more users;
   derived user information obtained based on at least one of the static and dynamic user information and the activity information of the one or more users; and
   derived content information obtained based on at least one of the static and dynamic content information and the activity information of the one or more users.

3. The method of claim 2, wherein the hybrid information is analyzed by:
   building a static profile based on the static user information and static content information for each of the one or more users when the user is offline;
   building a dynamic profile based on at least one of the dynamic user information and dynamic content information for each of the one or more users when the user is online; and
   generating an integrated profile for each of the one or more users by combing the static profile and the dynamic profile for the user.

4. The method of claim 2, wherein the hybrid information is analyzed by:
   analyzing at least one of the static user information and dynamic user information to extract attributes for each of the one or more users;
   analyzing at least one of the static content information and dynamic user information to extract topics of interest for each of the one or more users; and
   analyzing the activity information for the one or more users to infer the implicit relationships that associate the user with at least one of a topic of interest, another user, and content based on the hybrid model.

5. The method of claim 1, wherein the hybrid model is established based on a first matrix representing user features with respect to the one or more users and a second matrix representing topics/keywords with respect to the one or more users.

6. The method of claim 1, wherein the mapping includes at least one of user to user, user to document, user to feature, document to user, document to document, document to feature, feature to user, feature to document, and feature to feature.

7. A system for hybrid information query, comprising:
a hybrid query interface configured to:
receive a request from a user associated with a hybrid query, wherein the hybrid query is expressed in accordance with an input in terms of one of a user, a feature, and a document, and a desired hybrid query result in terms of one of a user, a feature, and a document, and provide the desired hybrid query result as a response to the hybrid query; and
a hybrid response recommendation engine configured to:
determine a mapping between the input and the desired hybrid query result,
retrieve a hybrid model established based on hybrid information collected and associated with one or more users,
wherein the hybrid model is established by:
analyzing the hybrid information to identify one or more explicit relationships in the hybrid information and to derive one or more implicit relationships among the one or more users based on the hybrid information; and
indexing the hybrid information based on the explicit and implicit relationships with respect to each of the one or more users; and
perform the mapping based on the hybrid model to obtain the desired hybrid query result based on the input.

8. The system of claim 7, wherein the hybrid information collected and associated with one or more users includes at least one of:
static user information about the one or more users;
static content information associated with usage of such content by the one or more users;
activity information associated with online activities of the one or more users;
dynamic user information related to a dynamic online context surrounding the one or more users when they are online;
dynamic content information collected online with respect to the one or more users;
derived user information obtained based on at least one of the static and dynamic user information and the activity information of the one or more users; and
derived content information obtained based on at least one of the static and dynamic content information and the activity information of the one or more users.

9. The system of claim 8, wherein the hybrid information is analyzed by:
building a static profile based on the static user information and static content information for each of the one or more users when the user is offline;
building a dynamic profile based on at least one of the dynamic user information and dynamic content information for each of the one or more users when the user is online; and
generating an integrated profile for each of the one or more users by combing the static profile and the dynamic profile for the user.

10. The system of claim 8, wherein the hybrid information is analyzed by:
analyzing at least one of the static user information and dynamic user information to extract attributes for each of the one or more users;
analyzing at least one of the static content information and dynamic user information to extract topics of interest for each of the one or more users; and
analyzing the activity information for the one or more users to infer the implicit relationships that associate the user with at least one of a topic of interest, another user, and content based on the hybrid model.

11. The system of claim 7, wherein the hybrid model is established based on a first matrix representing user features with respect to the one or more users and a second matrix representing topics/keywords with respect to the one or more users.

12. The system of claim 7, wherein the mapping includes at least one of user to user, user to document, user to feature, document to user, document to document, document to feature, feature to user, feature to document, and feature to feature.

13. A machine-readable tangible and non-transitory medium having information for hybrid information query recorded thereon, wherein the information, when read by the machine, causes the machine to perform the following:
receiving a request from a user associated with a hybrid query, wherein the hybrid query is expressed in accordance with an input in terms of one of a user, a feature, and a document, and a desired hybrid query result in terms of one of a user, a feature, and a document;
determining a mapping between the input and the desired hybrid query result;
retrieving a hybrid model established based on hybrid information collected and associated with one or more users,
wherein the hybrid model is established by:
analyzing the hybrid information to identify one or more explicit relationships in the hybrid information and to derive one or more implicit relationships among the one or more users based on the hybrid information; and
indexing the hybrid information based on the explicit and implicit relationships with respect to each of the one or more users;
performing the mapping based on the hybrid model to obtain the desired hybrid query result based on the input; and
providing the desired hybrid query result as a response to the hybrid query.

14. The medium of claim 13, wherein the hybrid information collected and associated with one or more users includes at least one of:
static user information about the one or more users;
static content information associated with usage of such content by the one or more users;
activity information associated with online activities of the one or more users;
dynamic user information related to a dynamic online context surrounding the one or more users when they are online;
dynamic content information collected online with respect to the one or more users;
derived user information obtained based on at least one of the static and dynamic user information and the activity information of the one or more users; and
derived content information obtained based on at least one of the static and dynamic content information and the activity information of the one or more users.

15. The medium of claim 14, wherein the hybrid information is analyzed by:
  building a static profile based on the static user information and static content information for each of the one or more users when the user is offline;
  building a dynamic profile based on at least one of the dynamic user information and dynamic content information for each of the one or more users when the user is online; and
  generating an integrated profile for each of the one or more users by combing the static profile and the dynamic profile for the user.

16. The medium of claim 14, wherein the hybrid information is analyzed by:
  analyzing at least one of the static user information and dynamic user information to extract attributes for each of the one or more users;
  analyzing at least one of the static content information and dynamic user information to extract topics of interest for each of the one or more users; and
  analyzing the activity information for the one or more users to infer the implicit relationships that associate the user with at least one of a topic of interest, another user, and content based on the hybrid model.

17. The medium of claim 14, wherein the hybrid model is established based on a first matrix representing user features with respect to the one or more users and a second matrix representing topics/keywords with respect to the one or more users.

18. The medium of claim 13, wherein the mapping includes at least one of user to user, user to document, user to feature, document to user, document to document, document to feature, feature to user, feature to document, and feature to feature.

* * * * *